US012605696B1

(12) United States Patent
Mohamed et al.

(10) Patent No.: US 12,605,696 B1
(45) Date of Patent: Apr. 21, 2026

(54) COMPOSITE MATERIAL COMPRISING PINEAPPLE PEEL CARBON AND OXYGEN-DEFICIENT BLACK ZINC OXIDE NANOPARTICLES AND A METHOD OF PREPARATION THEREOF

(71) Applicant: King Fahd University of Petroleum and Minerals, Dhahran (SA)

(72) Inventors: Mohamed Jaffer Sadiq Mohamed, Dhahran (SA); Muhammad Ashraf Gondal, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/316,501

(22) Filed: Sep. 2, 2025

(51) Int. Cl.
B01J 23/06 (2006.01)
B01J 19/12 (2006.01)
(Continued)

(52) U.S. Cl.
CPC ............. *B01J 23/06* (2013.01); *B01J 19/123* (2013.01); *B01J 19/127* (2013.01); *B01J 21/18* (2013.01); *B01J 35/39* (2024.01); *B01J 35/45* (2024.01); *B01J 37/009* (2013.01); *B01J 37/0221* (2013.01); *B01J 37/0236* (2013.01); *B01J 37/04* (2013.01); *B01J 37/343* (2013.01); *B01J 37/344* (2013.01); *C01B 3/22* (2013.01); *B01J 2219/0877* (2013.01); *B01J 2219/0892* (2013.01); *B01J 2219/1203* (2013.01);
(Continued)

(58) Field of Classification Search
CPC ... B01J 23/06; B01J 35/45; B01J 35/39; B01J 19/123; B01J 19/127

USPC ..................................................... 204/157.52
See application file for complete search history.

(56) References Cited

U.S. PATENT DOCUMENTS

2022/0162726 A1 5/2022 Mennell et al.
2024/0228276 A1 7/2024 Atkins

FOREIGN PATENT DOCUMENTS

CN 109851446 A 6/2019
WO WO 2021/059554 A1 4/2021

OTHER PUBLICATIONS

Ahmadi, Sajad, and Hossein Ganjidoust. "Using banana peel waste to synthesize BPAC/ZnO nanocomposite for photocatalytic degradation of Acid Blue 25: Influential parameters, mineralization, biodegradability studies." Journal of Environmental Chemical Engineering 9.5 (2021): 106010 (Year: 2021).*

(Continued)

*Primary Examiner* — James Lin
*Assistant Examiner* — John Lee
(74) *Attorney, Agent, or Firm* — Oblon, McClelland, Maier & Neustadt, L.L.P.

(57) ABSTRACT

A composite material includes pineapple peel carbon and oxygen-deficient black zinc oxide (b-ZnO$_{vac}$) nanoparticles. The composite material includes 2 to 20 weight percent (wt. %) pineapple peel carbon based on a total weight of the composite material. The pineapple peel carbon and the oxygen-deficient black ZnO nanoparticles are bonded through carbon-zinc interfaces and carbon-oxygen-zinc interfaces. The pineapple peel carbon has a sheet morphology. The oxygen-deficient black zinc oxide nanoparticles are coated with the pineapple peel carbon. The composite material has an X-ray diffraction (XRD) peak at a 2θ value of 36.27° to 36.34°.

20 Claims, 19 Drawing Sheets

(51) Int. Cl.

| | |
|---|---|
| *B01J 21/18* | (2006.01) |
| *B01J 35/39* | (2024.01) |
| *B01J 35/45* | (2024.01) |
| *B01J 37/00* | (2006.01) |
| *B01J 37/02* | (2006.01) |
| *B01J 37/04* | (2006.01) |
| *B01J 37/34* | (2006.01) |
| *C01B 3/22* | (2006.01) |

(52) U.S. Cl.
CPC ................ *C01B 2203/0277* (2013.01); *C01B 2203/1076* (2013.01); *C01B 2203/1082* (2013.01); *C01B 2203/1223* (2013.01)

(56) References Cited

OTHER PUBLICATIONS

Bharathidasan, T., et al. "Zinc oxide-containing porous boron-carbon-nitrogen sheets from glycine-nitrate combustion: Synthesis, self-cleaning, and sunlight-driven photocatalytic activity." ACS Applied Materials & Interfaces 7.33 (2015): 18450-18459 (Year: 2015).*

Guillén, G. García, et al. "Structure and morphologies of ZnO nanoparticles synthesized by pulsed laser ablation in liquid: Effects of temperature and energy fluence." Materials Chemistry and Physics 162 (2015): 561-570 (Year: 2015).*

Hassan Basri, Hasbullah, et al. "Effect of synthesis temperature on the size of ZnO nanoparticles derived from pineapple peel extract and antibacterial activity of ZnO-starch nanocomposite films." Nanomaterials 10.6 (2020): 1061 (Year: 2020).*

Kanakkillam, Sreed Sharma, et al. "Defects rich nanostructured black zinc oxide formed by nanosecond pulsed laser irradiation in liquid." Applied Surface Science 567 (2021): 150858 (Year: 2021).*

Fatma Y. Hassaneen, et al., "Impact of innovative nanoadditives on biodigesters microbiome", Microbial Biotechnology, vol. 16, Issue 1, Jan. 2023, pp. 128-138.

* cited by examiner

COMPOSITE MATERIAL COMPRISING PINEAPPLE PEEL CARBON AND OXYGEN-DEFICIENT BLACK ZINC OXIDE NANOPARTICLES AND A METHOD OF PREPARATION THEREOF

CROSS-REFERENCE TO RELATED APPLICATION

The present disclosure claims the benefit of Saudi Patent Application No. 1020255717, filed Aug. 7, 2025, with the Saudi Authority for Intellectual Property Office, which is incorporated herein by reference in its entirety.

BACKGROUND

Technical Field

The present disclosure is directed to a composite material, more particularly, to a composite material including pineapple peel carbon (ppC) and oxygen-deficient black zinc oxide (b-ZnO$_{vac}$) nanoparticles used as a photocatalyst for hydrogen production.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present disclosure.

Photocatalytic generation of hydrogen (H$_2$) through water splitting has gained attention as a sustainable and clean energy solution. This process involves three steps: light absorption, charge separation, and surface reactions on semiconductors. Among various photocatalysts, zinc oxide (ZnO) is a promising candidate due to its strong oxidizing power, chemical stability, non-toxicity, and affordability; however, pure ZnO suffers from two major limitations including a wide band gap that restricts light absorption to the ultraviolet region (which constitutes only about 3% of sunlight) and the fast recombination of photogenerated electron-hole pairs leads to poor quantum efficiency.

To overcome drawbacks, defect engineering techniques to enhance the visible light responsiveness of ZnO have been explored. Introducing oxygen vacancies and dopants alters the band structure and optical properties, producing what is known as black ZnO (b-ZnO), which can absorb a broader spectrum of light, including visible and near-infrared regions. Additionally, these modifications enhance charge carrier separation and reduce recombination, resulting in improved photocatalytic performance. Despite improvements, controlled synthesis of b-ZnO remains challenging, and limited studies have reliably demonstrated enhanced photocatalytic activity.

Combining ZnO with carbon materials derived from agricultural biowaste has been explored to overcome challenges. Carbon materials exhibit enhanced electronic properties, high surface areas, and strong adsorption capabilities, making them candidates for improving light absorption and promoting charge separation in photocatalytic systems. When integrated with semiconductor oxides, biowaste-derived carbon can serve as an efficient electron acceptor and donor; however, major limitations persists in establishing strong chemical bonds at the carbon-metal oxide interface (i.e., C-M and/or C—O-M linkages), which are used for effective interfacial charge transfer.

Accordingly, an object of the present disclosure to provide a composite material based on pineapple bio-waste incorporated with oxygen-deficient black zinc oxide nanoparticles to overcome drawbacks and limitations known in the art. The link between carbon and zinc via a carbon-zinc (C—Zn) and/or carbon-oxygen-zinc (C—O—Zn) may play a role in enhancing the movement of electrons in a photocatalytic device. The produced nanostructures serve as photocatalysts responsive to visible light, enabling the production of H$_2$ from methanol solutions.

SUMMARY

In an exemplary embodiment, a composite material is described. The composite material includes pineapple peel carbon and oxygen-deficient black zinc oxide (b-ZnO$_{vac}$) nanoparticles. The composite material includes 2 to 20 weight percent (wt. %) pineapple peel carbon based on a total weight of the composite material. The pineapple peel carbon and the oxygen-deficient black ZnO nanoparticles are bonded through carbon-zinc interfaces and carbon-oxygen-zinc interfaces. The pineapple peel carbon has a sheet morphology. The oxygen-deficient black zinc oxide nanoparticles are coated with the pineapple peel carbon. The composite material has an X-ray diffraction (XRD) peak at a 2θ value of 36.27° to 36.34°.

In some embodiments, a method of forming the oxygen-deficient black ZnO nanoparticles is described. The method includes sonicating zinc oxide powder in an alcohol for 10 to 20 minutes to form a dispersed mixture, stirring and irradiating the dispersed mixture with a Nd:YAG pulsed laser at a wavelength of 532 nanometers (nm) for 40 to 80 minutes. The method further includes filtering the irradiated, dispersed mixture to collect a solid and drying the solid to form the oxygen-deficient black zinc oxide nanoparticles.

In some embodiments, the Nd:YAG pulsed laser has a pulse-energy of 350 millijoules (mJ), a pulse-duration of 10 nanoseconds (ns), a pulse-width of 9 ns, and a pulse-repetition frequency of 10 hertz (Hz).

In some embodiments, a method of forming the composite material is described. The method includes sonicating the pineapple peel carbon and the oxygen-deficient black zinc oxide nanoparticles in water for 40 to 80 minutes to form a mixture, filtering the mixture to collect a product, and drying the product at a temperature of 60 to 100 degrees Celsius (° C.) for 12 to 36 hours (h) to form the composite material.

In some embodiments, a weight ratio of the pineapple peel carbon to the oxygen-deficient black ZnO nanoparticles is 1-20:100.

In some embodiments, the sonicating occurs for 50 to 70 minutes.

Int some embodiments, a method of hydrogen production is described. The method includes contacting the composite material with methanol to form a solution and stirring and irradiating the solution at a wavelength of 390 to 410 nm for 2 to 6 h to form hydrogen gas.

In some embodiments, the composite material produces hydrogen at a rate of 200 to 230 micromoles per hour per gram ($\mu$mol·h$^{-1}$·g$^{-1}$).

In some embodiments, the composite material has an O Is peak at 532 to 534 electron volts (eV), indicating a Zn—O—C bond via X-ray photoelectron spectroscopy (XPS).

In some embodiments, the sheet morphology of the pineapple peel carbon has a longest dimension of 0.5 to 3 micrometers (μm).

In some embodiments, the oxygen-deficient black zinc oxide nanoparticles have a longest dimension of 10 to 100 nm.

In some embodiments, the oxygen-deficient black zinc oxide nanoparticles are agglomerated.

In some embodiments, the composite material includes zinc in an amount of 45 to 55 wt. %, carbon in an amount of 35 to 40 wt. %, and oxygen in an amount of 10 to 15 wt. % based on the total weight of the composite material.

In some embodiments, the composite material has a g value of 1.9 to 2 determined by electron paramagnetic resonance.

In some embodiments, the composite material has a bandgap energy value of 2.8 to 3.1 eV.

In some embodiments, the method of hydrogen production further includes irradiating the solution at a wavelength of 370 to 390 nm.

In some embodiments, the composite material produces hydrogen at a rate of 230 to 250 $\mu mol \cdot h^{-1} \cdot g^{-1}$.

In some embodiments, the method of hydrogen production further includes repeating the contacting and stirring and irradiating 4 to 6 times. After the repeating, the composite material has a hydrogen production rate of at least 95% of an initial hydrogen production rate of the composite material.

In some embodiments, the composite material has a valence band value of 2.6 to 2.8 eV.

In some embodiments, the composite material has a conduction band value of −0.15 to −0.1 eV.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

5

Figure 10A:
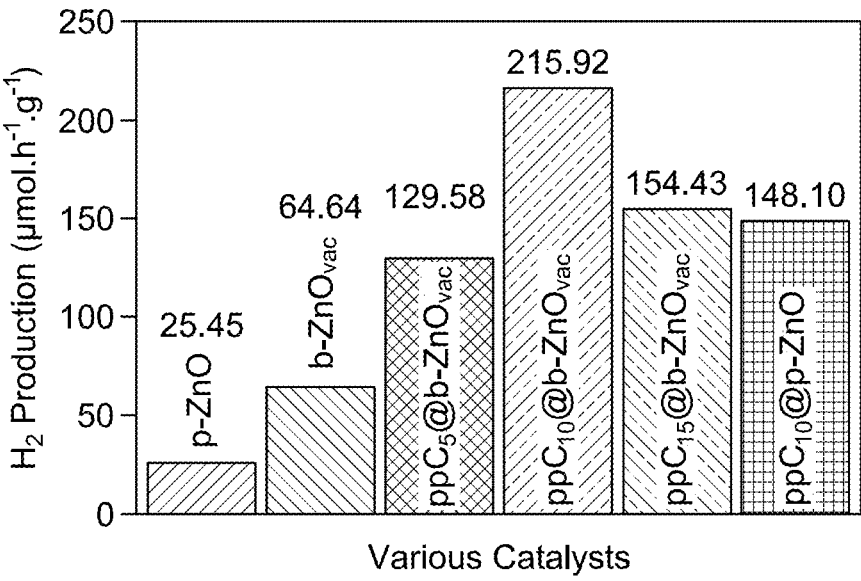
FIG. 10A shows H$_2$ production of p-ZnO, b-ZnO$_{vac}$, ppC$_5$@b-ZnO$_{vac}$, ppC$_{10}$@b-ZnO$_{vac}$, ppC$_{15}$@b-ZnO$_{vac}$, and ppC$_{10}$@p-ZnO, according to certain embodiments.
Figure 10B:
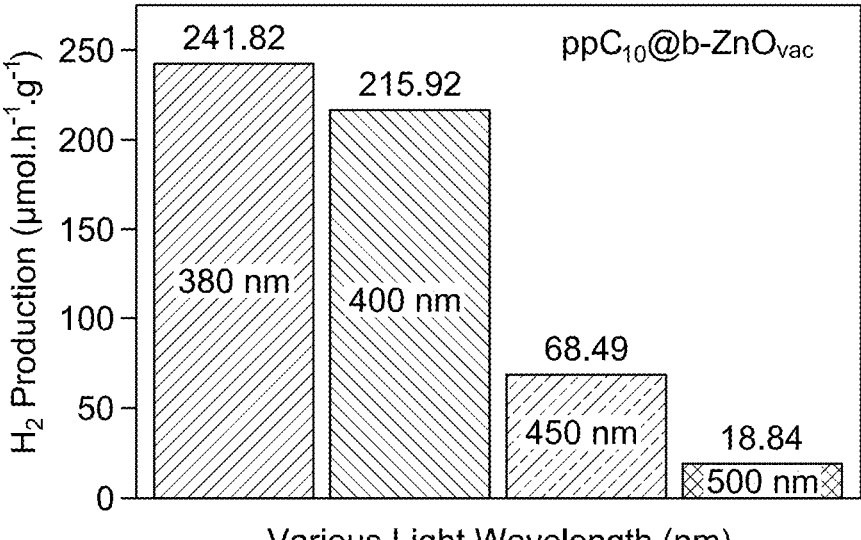

FIG. 10B shows $H_2$ production at various wavelengths for $ppC_{10}@b\text{-}ZnO_{vac}$, according to certain embodiments.

Figure 10C:
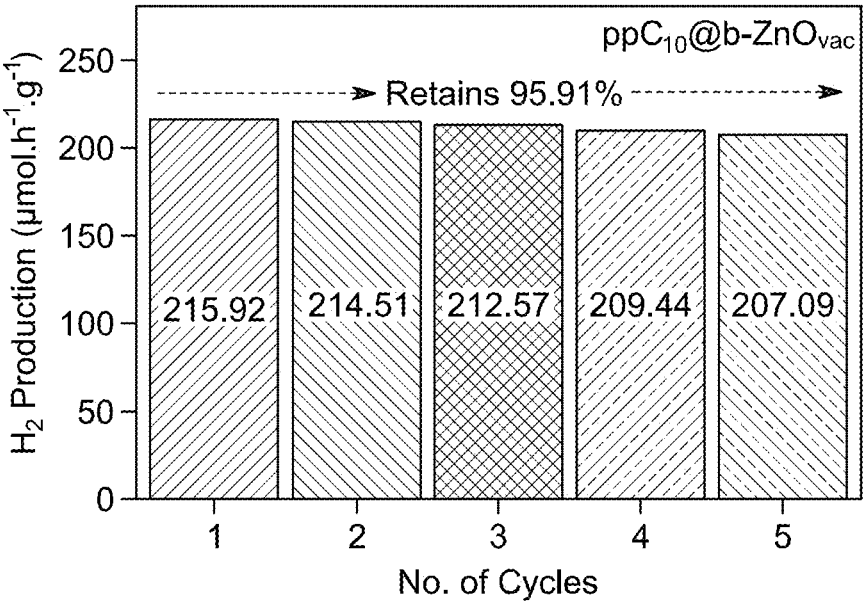

FIG. 10C shows a reusability test of $ppC_{10}@b\text{-}ZnO_{vac}$ for hydrogen production, according to certain embodiments.

Figure 10D:
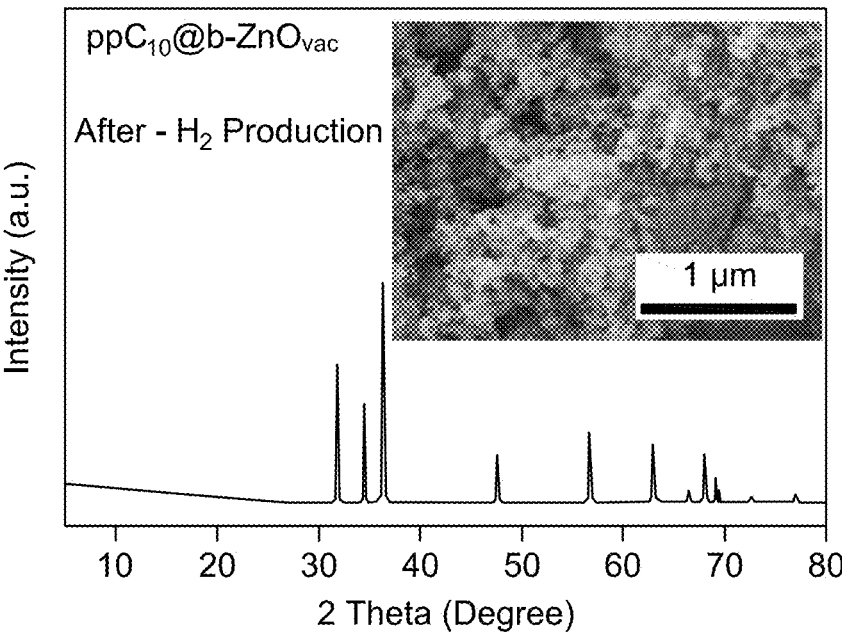

FIG. 10D depicts a stability test of $ppC_{10}@b\text{-}ZnO_{vac}$ after hydrogen production, according to certain embodiments.

Figure 11:
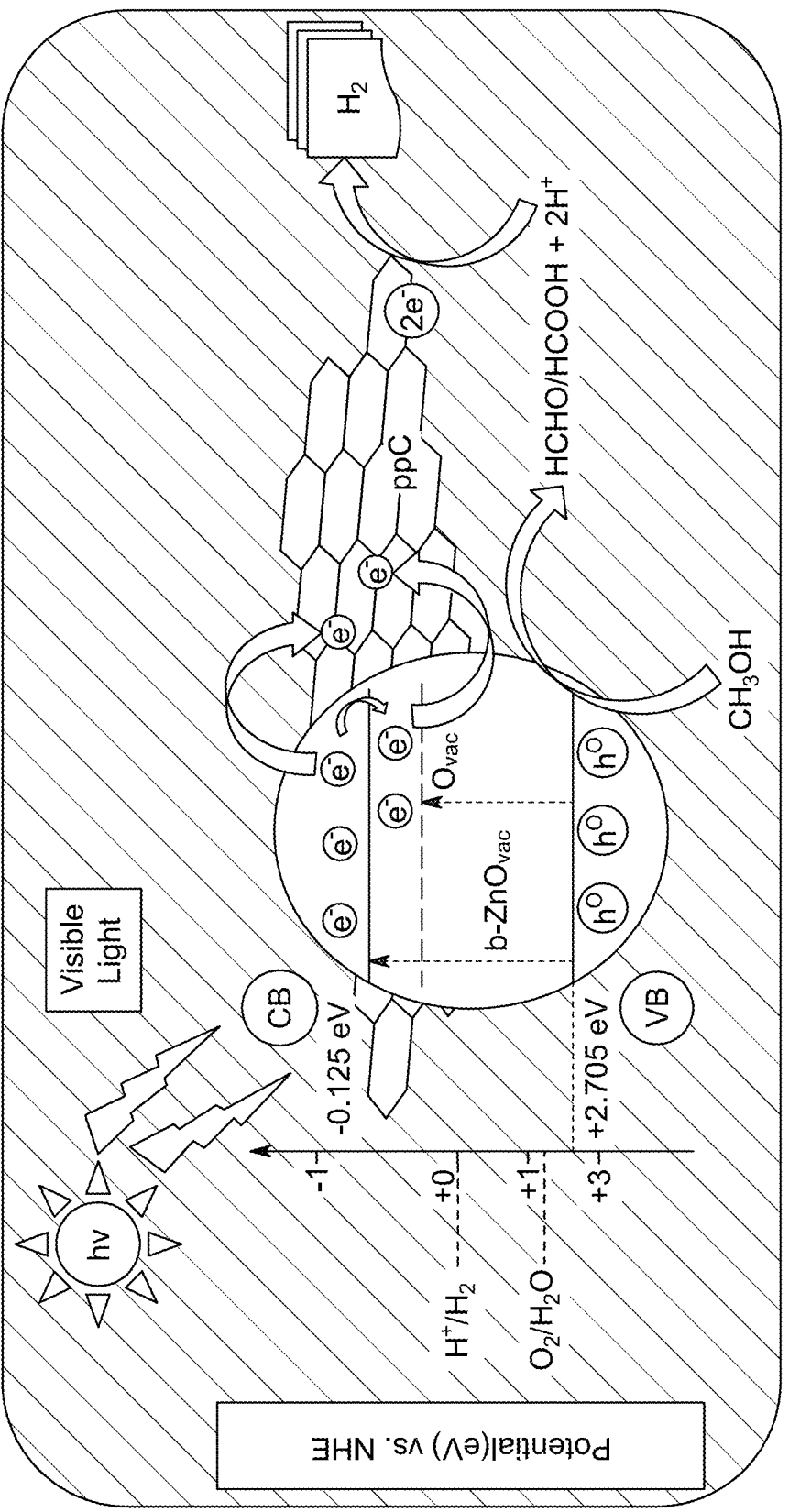

FIG. 11 is a diagram of a mechanism for photocatalytic $H_2$ production in $ppC_x@b\text{-}ZnO_{vac}$ nanostructures, according to certain embodiments.

DETAILED DESCRIPTION

When describing the present disclosure, terms used are to be construed in accordance with the following definitions, unless a context dictates otherwise.

Embodiments of the present disclosure will now be described more fully hereinafter with reference to the accompanying drawings, wherever applicable, in that some, but not all, embodiments of the disclosure are shown.

In the drawings, like numbered reference numerals will be used to designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoint.

As used herein, the term "room temperature" refers to a temperature range of 25±3 degrees Celsius (° C.).

As used herein, the term "nanoparticles" refers to a material (i.e., particles) having a size (i.e., particle size) of 1 to 500 nanometers (nm).

As used herein, the term "composite material" refers to a combination of two or more different matters (i.e., materials), typically a matrix and a reinforcement physically bonded together to produce a material with properties different to those of the individual components.

As used herein, the term "amount" refers to a proportion or presence of a substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

A weight percent of a component, unless specifically stated to the contrary, is based on a total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of this disclosure are directed to a composite material based on pineapple bio-waste incorporated with oxygen-deficient black zinc oxide nanoparticles. The composite material serves as a photocatalyst for hydrogen production. The link between carbon and zinc via a carbon-zinc (C—Zn) and/or carbon-oxygen-zinc (C—O—Zn) plays a role in enhancing the movement of electrons during photocatalytic activity.

According to a first aspect of the present disclosure, a composite material including pineapple peel carbon (ppC) and oxygen-deficient black zinc oxide ($b\text{-}ZnO_{vac}$) nanoparticles is described. The composite material includes 2 to 20 wt. %, preferably 2.5 to 19.5 wt. %, preferably 3 to 19 wt. %, preferably 3.5 to 18.5 wt. %, preferably 4 to 18 wt. %, preferably 5 to 17 wt. %, preferably 6 to 16 wt. %, preferably 7 to 15 wt. %, preferably 8 to 14 wt. %, preferably 9 to 13 wt. %, and preferably 10 to 12 wt. % ppC based on a total weight of the composite material. In a preferred embodiment, the composite material includes about 4.7 wt. % ppC based on a total weight of the composite material. In another preferred embodiment, the composite material includes about 9 wt. % ppC based on a total weight of the composite material. In yet another preferred embodiment, the composite material includes about 13 wt. % ppC based on a total weight of the composite material.

In some embodiments, a weight ratio of the ppC to the $b\text{-}ZnO_{vac}$ nanoparticles is 1-20:100, preferably 2-19:100, preferably 3-18:100, preferably 4-17:100, preferably 5-16:100, preferably 6-15:100, preferably 7-14:100, preferably 8-13:100, preferably 9-12:100, and preferably 10-11:100. In a preferred embodiment, a weight ratio of the ppC to the $b\text{-}ZnO_{vac}$ is about 5:100. In another preferred embodiment, a weight ratio of the ppC to the $b\text{-}ZnO_{vac}$ is about 10:100. In yet another preferred embodiment, a weight ratio of the ppC to the $b\text{-}ZnO_{vac}$ is about 15:100.

In some embodiments, the composite material includes zinc in an amount of 45 to 55 wt. %, preferably 46 to 54 wt. %, preferably 47 to 53 wt. %, preferably 48 to 52 wt. %, and preferably 49 to 51 wt. %, carbon in an amount of 35 to 40 wt. %, preferably 36 to 39 wt. %, and preferably 37 to 38 wt. %, and oxygen in an amount of 10 to 15 wt. %, preferably 11 to 14 wt. %, and preferably 12 to 13 wt. % based on the total weight of the composite material. In a preferred embodiment, the composite material includes zinc in an amount of about 49.1 wt. %, carbon in an amount of about 37.4 wt. %, and oxygen in an amount of about 13.5 wt. % based on the total weight of the composite material.

The ppC and the $b\text{-}ZnO_{vac}$ nanoparticles are bonded through carbon-zinc (C—Zn) interfaces and carbon-oxygen-zinc (C—O—Zn) interfaces. In some embodiments, the ppC and the $b\text{-}ZnO_{vac}$ nanoparticles may be bonded through intramolecular forces such as covalent bonds and/or metallic bonds. Nanoparticles bonded via C—Zn and C—O—Zn interfaces show strong interactions with the carbon matrix. The C—Zn bond involves direct linkage between carbon and zinc atoms, while carbon and zinc atoms in the C—O—Zn bond are formed through oxygen bridges, enhancing nanoparticle stability, dispersion, and functional performance. In some embodiments, the ppC and the b-ZnO$_{vac}$ nanoparticles may interact through intermolecular forces such as dipole-dipole interactions and/or London dispersion forces. In alternative embodiments, the ppC and the b-ZnO$_{vac}$ nanoparticles may be bonded through oxygen-zinc (O—Zn) interfaces and/or carbon-oxygen (C—O) interfaces.

The pineapple peel carbon has a sheet morphology. In alternative embodiments, the ppC may exist in various morphological structures such as porous structures, flake-like structures, sheet-like structures, spherical particles, tubular structures, fibrous structures, amorphous carbon, honeycomb-like structures, a combination thereof, and the like.

The b-ZnO$_{vac}$ nanoparticles are coated with the ppC. The b-ZnO$_{vac}$ nanoparticles may exist in various morphological shapes such as nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, a combination thereof, and the like. In some embodiments, the b-ZnO$_{vac}$ nanoparticles have a polyhedral structure. In some embodiments, the b-ZnO$_{vac}$ nanoparticles are agglomerated. In some embodiments, the b-ZnO$_{vac}$ nanoparticles possess an irregular polyhedral structural shape and are clustered together to form bigger agglomerates.

The composite material has an X-ray diffraction (XRD) peak at a 2θ value of 36.27° to 36.34°, preferably 36.28° to 36.33°, preferably 36.29° to 36.32°, and preferably 36.3° to 36.31°. In a preferred embodiment, the composite material has an XRD peak at a 2θ value of about 36.33°.

In some embodiments, the composite material has an O 1s peak at 532 to 534 eV, preferably 532.1 to 533.9 eV, preferably 532.2 to 533.8 eV, preferably 532.3 to 533.7 eV, preferably 532.4 to 533.6 eV, preferably 532.5 to 533.5 eV, preferably 532.6 to 533.4 eV, preferably 532.7 to 533.3 eV, preferably 532.8 to 533.2 eV, and preferably 532.9 to 533.1 eV, indicating a Zn—O—C bond via X-ray photoelectron spectroscopy (XPS). In a preferred embodiment, the composite material has an O Is peak at about 533.08 eV, indicating a Zn—O—C bond via XPS.

In some embodiments, the sheet morphology of the ppC has a longest dimension of 0.5 to 3.0 micrometers (μm), preferably 0.6 to 2.9 μm, preferably 0.7 to 2.8 μm, preferably 0.8 to 2.7 μm, preferably 0.9 to 2.6 μm, preferably 1 to 2.5 μm, preferably 1.1 to 2.4 μm, preferably 1.2 to 2.3 μm, preferably 1.3 to 2.2 μm, preferably 1.4 to 2.1 μm, preferably 1.5 to 2 μm, preferably 1.6 to 1.9 μm, and preferably 1.7 to 1.8 μm. In some embodiments, the b-ZnO$_{vac}$ nanoparticles have a longest dimension of 10 to 100 nm, preferably 15 to 95 nm, preferably 20 to 90 nm, preferably 25 to 85 nm, preferably 30 to 80 nm, preferably 35 to 75 nm, preferably 40 to 70 nm, preferably 45 to 65 nm, and preferably 50 to 60 nm.

As used herein, the term "g value" (also referred to as a g-value, g-factor, and/or Landé g-factor) refers to a dimensionless quantity that represents a constant of proportionality between a magnetic field and the energy different between the system's energy levels. It can be obtained by measuring the resonance frequency of a paramagnetic substance absorbing electromagnetic radiation in the presence of a magnetic field. The g value represents the extent to which the electron spin interacts with the external magnetic field. The g value is used to determine the number of unpaired electrons and their orbital angular momentum. In some embodiments, the composite material has a g value of 1.9 to 2.0, preferably 1.91 to 1.99, preferably 1.92 to 1.98, preferably 1.93 to 1.97, and preferably 1.94 to 1.96 determined by electron paramagnetic resonance (EPR). In a preferred embodiment, the composite material has a g value of about 1.964 determined by electron paramagnetic resonance.

In some embodiments, the composite material has a bandgap energy value of 2.8 to 3.1 eV, preferably 2.81 to 3.09 eV, preferably 2.82 to 3.08 eV, preferably 2.83 to 3.07 eV, preferably 2.84 to 3.06 eV, preferably 2.85 to 3.05 eV, preferably 2.86 to 3.04 eV, preferably 2.87 to 3.03 eV, preferably 2.88 to 3.02 eV, preferably 2.89 to 3.01 eV, preferably 2.9 to 3 eV, preferably 2.91 to 2.99 eV, preferably 2.92 to 2.98 eV, 2.93 to 2.97 eV, and preferably 2.94 to 2.96 eV. In a preferred embodiment, the composite material has a bandgap energy value of about 2.83 eV. In some embodiments, the composite material has a valence band value of 2.6 to 2.8 eV, preferably 2.61 to 2.79 eV, preferably 2.62 to 2.78 eV, preferably 2.63 to 2.77 eV, preferably 2.64 to 2.76 eV, preferably 2.65 to 2.75 eV, preferably 2.66 to 2.74 eV, preferably 2.67 to 2.73 eV, preferably 2.68 to 2.72 eV, and more preferably 2.69 to 2.71 eV. In a preferred embodiment, the composite material has a valence band value of about 2.705 eV.

In some embodiments, the composite material has a conduction band value of -0.15 to −0.1 5 eV, preferably −0.14 to −0.11 eV, and preferably −0.13 to −0.12 eV. In a preferred embodiment, the composite material has a conduction band value of about −0.125 eV.

Figure 1A:
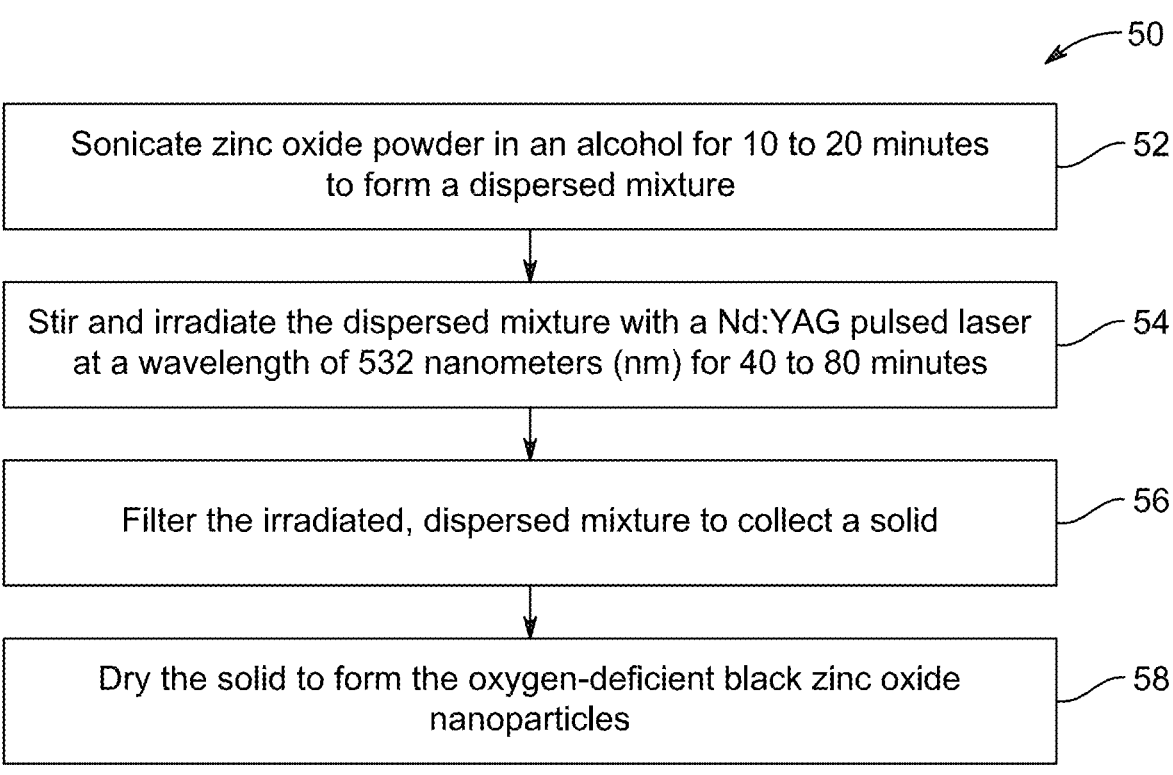
FIG. 1A is an exemplary flowchart of a method of forming oxygen-deficient black zinc oxide (b-ZnO$_{vac}$) nanoparticles, according to certain embodiments.

FIG. 1A illustrates a flow chart of a method 50 for forming the b-ZnO$_{vac}$ nanoparticles. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes sonicating zinc oxide powder in an alcohol for 10 to 20 minutes, preferably 11 to 19 minutes, preferably 12 to 18 minutes, preferably 13 to 17 minutes, more preferably 14 to 16 minutes, and yet more preferably about 15 minutes to form a dispersed mixture. In some embodiments, the alcohol may include, but is not limited to, methanol, ethanol, propanol, isopropanol, butanol, a combination thereof, and the like. In a preferred embodiment, the zinc oxide powder is sonicated in isopropanol for 15 minutes to form a dispersed mixture.

At step 54, the method 50 includes stirring and irradiating the dispersed mixture with a Nd:YAG (neodymium-doped yttrium aluminum garnet) pulsed laser at a wavelength of 532 nanometers (nm) for 40 to 80 minutes, preferably 42 to 78 minutes, preferably 44 to 76 minutes, preferably 46 to 74 minutes, preferably 48 to 72 minutes, preferably 50 to 70 minutes, preferably 52 to 68 minutes, preferably 54 to 66 minutes, preferably 56 to 64 minutes, and more preferably 58 to 62 minutes. In a preferred embodiment, the dispersed mixture is stirred and irradiated with the Nd:YAG pulsed laser at a wavelength of 532 nm for about 60 minutes. In some embodiments, the Nd:YAG pulsed laser has a pulse-energy of 350 millijoules (mJ), a pulse-duration of 10 nanoseconds (ns), a pulse-width of 9 ns, and a pulse-repetition frequency of 10 hertz (Hz). In alternative embodiments, the Nd:YAG pulsed laser may be used with any pulse-energy, pulse-duration, pulse-width, and pulse-repetition frequency known in the art.

In alternative embodiments, other solid-state laser such as, Nd:YVO$_4$ (neodymium-doped yttrium orthovanadate), Nd:YLF (neodymium-doped yttrium lithium fluoride), Nd: Glass (neodymium-doped glass), Nd:GdVO$_4$ (neodymium-doped gadolinium vanadate), Er: YAG (erbium-doped yttrium aluminum garnet), Ho:YAG (holmium-doped yttrium aluminum garnet), a combination thereof, and the like may be used in combination with or in place of the Nd:YAG pulsed laser.

At step 56, the method 50 includes filtering the irradiated, dispersed mixture to collect a solid. The solid may be separated from the dispersed mixture by methods including, but are not limited to, gravity filtration, centrifugation, hot filtration, cold filtration, granular media filtration, mechanical filtration, multilayer filtration, vacuum filtration a combination thereof, and the like. The water may be tap water, distilled water, bidistilled water, deionized water, deionized distilled water, reverse osmosis water, and/or some other water. In a preferred embodiment, the solid is isolated using a vacuum filtration system, subjected to several washes with an ethanol-DI water mixture.

At step 58, the method 50 includes drying the solid to form the oxygen-deficient black zinc oxide (b-ZnO$_{vac}$) nanoparticles. In some embodiments, the solid can be dried by oven drying, vacuum drying, infrared drying, freeze drying, hot plate drying, air drying, microwave drying, spray drying, rotary evaporation, desiccator drying, a combination thereof, and the like. In a preferred embodiment, the solid is dried in a desiccator at about 80° C. for about 24 h.

Figure 1B:
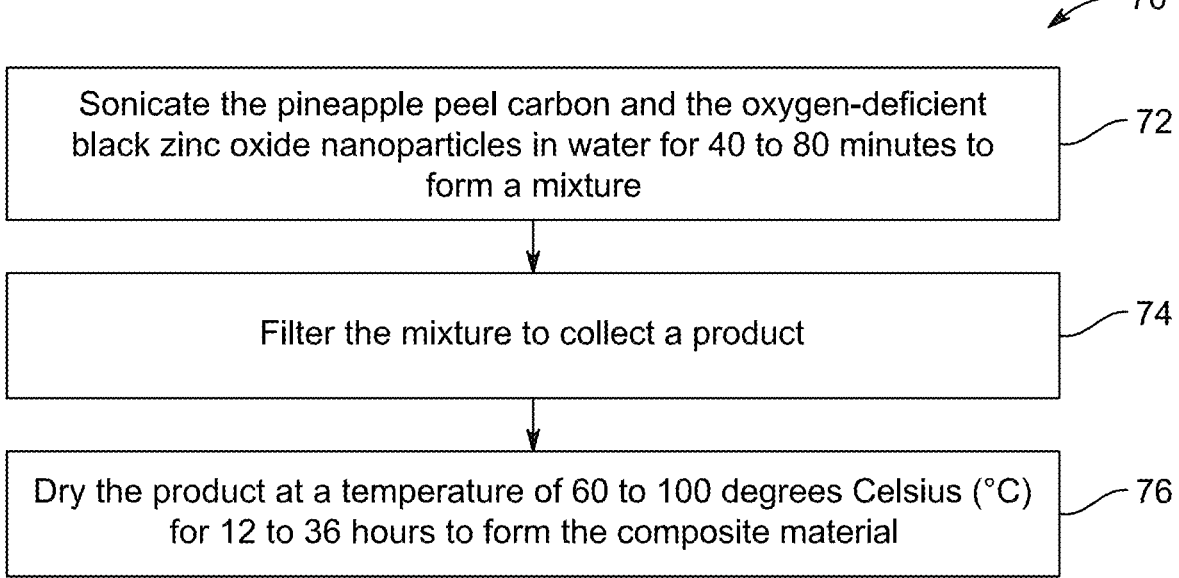
FIG. 1B is an exemplary flowchart of a method of forming a composite material, according to certain embodiments.

FIG. 1B illustrates a flow chart of a method 70 for forming the composite material. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes sonicating the ppC and the b-ZnO$_{vac}$ nanoparticles in water for 40 to 80 minutes, preferably 42 to 78 minutes, preferably 44 to 76 minutes, preferably 46 to 74 minutes, preferably 48 to 72 minutes, preferably 50 to 70 minutes, preferably 52 to 68 minutes, preferably 54 to 66 minutes, preferably 56 to 64 minutes, and preferably 58 to 62 minutes to form a mixture. In some embodiments, the sonicating occurs for 50 to 70 minutes, preferably 51 to 69, preferably 52 to 68 minutes, preferably 53 to 68 minutes, preferably 54 to 66 minutes, preferably 55 to 65, preferably 56 to 64 minutes, preferably 57 to 63, preferably 58 to 62 minutes, and more preferably 59 to 61 minutes. In a preferred embodiment, sonicating the ppC and the b-ZnO$_{vac}$ nanoparticles in water occurs for 60 minutes. The water may be tap water, distilled water, bidistilled water, deionized water, deionized distilled water, reverse osmosis water, and/or some other water.

At step 74, the method 70 includes filtering the mixture to collect a product. The product may be separated from the mixture by methods including, but are not limited to, gravity filtration, centrifugation, hot filtration, cold filtration, granular media filtration, mechanical filtration, multilayer filtration, and vacuum filtration. In a preferred embodiment, the product is isolated using a vacuum filtration system and subjected to several washes with an ethanol-DI water mixture.

At step 76, the method 70 includes drying the product at a temperature of 60 to 100 degrees Celsius (° C.), preferably 62 to 98° C., preferably 64 to 96° C., preferably 66 to 94° C., preferably 68 to 92° C., preferably 70 to 90° C., preferably 72 to 88° C., preferably 74 to 86° C., preferably 76 to 84° C., and more preferably 78 to 82° C. for 12 to 36 hours (h), preferably 13 to 35 h, preferably 14 h to 34 h, preferably 15 h to 33 h, preferably 16 h to 32 h, preferably 17 h to 31 h, preferably 18 h to 30 h, preferably 19 h to 29 h, preferably 20 h to 28 h, preferably 21 h to 27 h, preferably 22 h to 26 h, and more preferably 23 h to 25 h to form the composite material. In some embodiments, the drying can be done by oven drying, vacuum drying, infrared drying, freeze drying, hot plate drying, air drying, microwave drying, spray drying, rotary evaporation, desiccator drying, a combination thereof, and the like. In a preferred embodiment, the solid is dried by desiccator drying. In a preferred embodiment, drying the product at a temperature of 80° C. for 24 h forms the composite material.

Figure 1C:
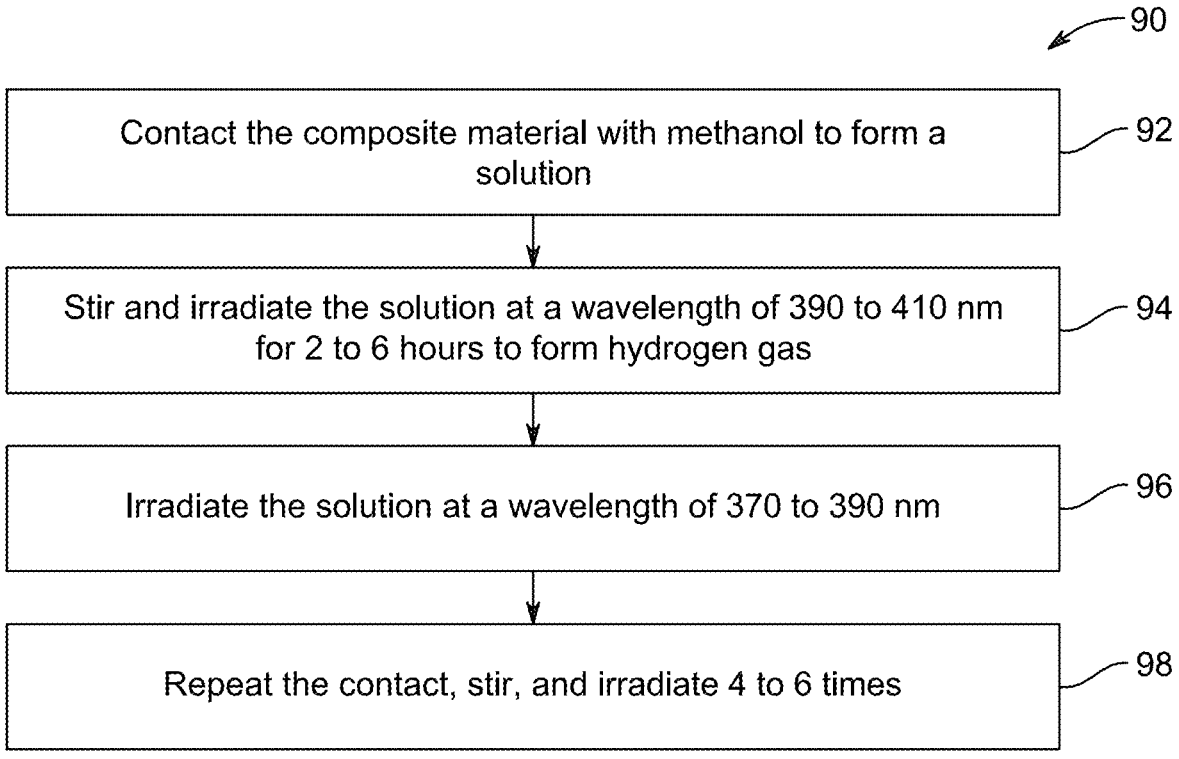
FIG. 1C is an exemplary flowchart of a method of hydrogen production, according to certain embodiments.

FIG. 1C illustrates a flow chart of a method 90 for hydrogen production. The order in which the method 90 is described is not intended to be construed as a limitation, and any number of the described method steps can be combined in any order to implement the method 90. Additionally, individual steps may be removed or skipped from the method 90 without departing from the spirit and scope of the present disclosure.

At step 92, the method 90 includes contacting the composite material with methanol to form a solution. Methanol acts as a sacrificial substance that acts as a hole scavenger. In some embodiments, the methanol used has a weight percent (wt. %) of 10 to 30, preferably 12 to 28 wt. %, preferably 14 to 26 wt. %, preferably 16 to 24 wt. %, and more preferably 18 to 22 wt. %. In a preferred embodiment, the methanol used has a weight percent of about 20.

At step 94, the method 90 includes stirring and irradiating the solution at a wavelength of 390 to 410 nm, preferably 391 to 409 nm, preferably 392 to 408 nm, preferably 393 to 407 nm, preferably 394 to 406 nm, preferably 395 to 405 nm, preferably 396 to 404 nm, preferably 397 to 403 nm, preferably 398 to 402 nm, and more preferably 399 to 401 nm for 2 to 6 h, preferably 2.5 to 5.5 h, preferably 3.0 to 5.0 h, and more preferably 3.5 to 4.5 h to form hydrogen gas. In a preferred embodiment, the method of stirring and irradiating the solution is performed at a wavelength of about 400 nm for about 4 h to form hydrogen gas. In some embodiments, the solution may be stirred via magnetic stirring, mechanical stirring, ultrasonic stirring, manual stirring, overhead stirring, a combination thereof, and the like. In a preferred embodiment, the solution is stirred via magnetic stirring.

At step 96, the method 90 optionally further includes irradiating the solution at a wavelength of 370 to 390 nm, preferably 371 to 389 nm, preferably 372 to 388 nm, preferably 373 to 387 nm, preferably 374 to 386 nm, preferably 375 to 385 nm, preferably 376 to 384 nm, preferably 377 to 383 nm, preferably 378 to 382 nm, and more preferably 379 to 381 nm. In a preferred embodiment, the solution is irradiated at a wavelength of about 380 nm.

At step 98, the method 90 optionally further includes repeating the contacting and stirring and irradiating 4 to 6 times and preferably 5 times.

In some embodiments, after the repeating the contacting and stirring and irradiating, the composite material has a hydrogen production rate of at least 95%, preferably at least 95.5%, preferably at least 96%, preferably at least 96.5%, preferably at least 97%, preferably at least 97.5%, preferably at least 98%, preferably at least 98.5%, and preferably at least 99% of the initial hydrogen production rate of the composite material. In a preferred embodiment, after the repeating the contacting and stirring and irradiating, the composite material has a hydrogen production rate of about 95.91%.

In some embodiments, the composite material produces hydrogen at a rate of 200 to 230 micromoles per hour per gram ($\mu mol \cdot h^{-1} \cdot g^{-1}$), preferably 202 to 228 $\mu mol \cdot h^{-1} \cdot g^{-1}$, preferably 204 to 226 $\mu mol \cdot h^{-1} \cdot g^{-1}$, preferably 206 to 224 $\mu mol \cdot h^{-1} \cdot g^{-1}$, preferably 208 to 222 $\mu mol \cdot h^{-1} \cdot g^{-1}$, preferably 210 to 220 $\mu mol \cdot h^{-1} \cdot g^{-1}$, preferably 212 to 218 $\mu mol$ $h^{-1} \cdot g^{-1}$, and more preferably 214 to 216 $\mu mol \cdot h^{-1} \cdot g^{-1}$. In a preferred embodiment, the composite material produces hydrogen at a rate of about 215.92 $\mu mol \cdot h^{-1} \cdot g^{-1}$ when irradiated at 400 nm.

In some embodiments, the composite material produces hydrogen at a rate of 230 to 250 $\mu mol \cdot h^{-1} \cdot g^{-1}$, preferably 231 to 249 $\mu mol \cdot h^{-1} \cdot g^{-1}$, preferably 232 to 248 $\mu mol \cdot h^{-1} \cdot g^{-1}$, preferably 233 to 247 $\mu mol \cdot h^{-1} \cdot g^{-1}$, preferably 234 to 246 $\mu mol \cdot h^{-1} \cdot g^{-1}$, preferably 235 to 245 $\mu mol \cdot h^{-1} \cdot g^{-1}$, preferably 236 to 244 $\mu mol$ $h^{-1} \cdot g^{-1}$, preferably 237 to 243 $\mu mol \cdot h^{-1} \cdot g^{-1}$, and more preferably 238 to 242 $\mu mol \cdot h^{-1} \cdot g^{-1}$. In a preferred embodiment, the composite material produces hydrogen at a rate of about 241.82 $\mu mol \cdot h^{-1} \cdot g^{-1}$ when irradiated at 380 nm.

EXAMPLES

The following examples describe and demonstrate a composite material comprising pineapple bio-waste and oxygen-deficient black ZnO as a photocatalyst for hydrogen production and a preparation method thereof. The examples are provided solely for illustration and are not to be construed as limitations of the present disclosure, as many variations thereof are possible without departing from the spirit and scope of the present disclosure.

Example 1: Materials

Chemicals, including potassium hydroxide (KOH), zinc nitrate ($Zn(NO_3)_2$), ethanol, methanol, and isopropanol, were obtained commercially from Sigma-Aldrich and utilized as received. The experimental solution was made using de-ionized (DI) water. Pineapple skins, classified as bio-waste, were gathered from a municipal area situated in the Kingdom of Saudi Arabia.

Example 2: Methods

Pineapple skins, classified as bio-waste, were gathered from a municipal area situated in the Kingdom of Saudi Arabia. The freshly collected pineapple skin bio-waste was fractured into tiny fragments and rinsed for several periods with DI water. The bio-waste was then allowed to air dry for two days before being dried in an oven set at 80 degrees Celsius (° C.) for 72 hours (h). The dried particles were crushed using a mortar and then carbonized at 450° C. for 4 h in an Argon (Ar) environment. The bio-carbon produced by the carbonization of pineapple skin bio-waste was employed in a chemical activation process using KOH. During the chemical activation process, bio-carbon produced from bio-waste was mixed with KOH pellets at a weight ratio of 1:3. Subsequently, the blend was then subjected to 3 h heat treatment at 750° C. in an Ar environment. Lastly, the obtained activated bio-carbon was systematically splashed with DI water until the solution achieved a neutral pH. The bio-carbon was then rinsed with ethanol and desiccated at 60° C. for 24 h. From here on, bio-carbon originating from bio-waste will be represented as ppC. The yield of bio-carbon was 48.19 weight percent (wt. %), determined by dividing the weight of bio-carbon extracted from bio-waste (2.4093 grams (g)) by the weight of pineapple skin bio-waste (5.0 g) and multiplying by 100.

The methodology described herein is a straightforward method of ultrasonication to produce ZnO. In brief, $Zn(NO_3)_2$ (0.01 molar (M)) was dissolved in 50 milliliters (mL) of DI water and agitated for 30 minutes. Afterwards, a solution containing KOH (0.01 M) was added gradually and in small droplets to the zinc nitrate solution. The mixture was subjected to ultrasound dealing for 1 h to generate a solid suspension. The resulting solid was isolated using a vacuum filtration system, subjected to several washes with an ethanol-DI water mixture, and then desiccated at 80° C. for 24 h. After that, the substance was subjected to calcination at 400° C. for 4 h. From here on, this solid will be referred to as p-ZnO.

The methodology described herein outlines a method for creating oxygen-deficient black zinc oxide (b-$ZnO_{vac}$) using an ultrasonication-assisted laser beam technique. The laser beam technique used a pulsed laser source, namely the Nd:YAG laser operational at 532 nanometers (nm) with a pulse-energy of 350 millijoules (mJ), a pulse-duration of 10 nanoseconds (ns), a pulse-width of 9 ns, and a pulse-repetition frequency of 10 hertz (Hz) [Mohamed, M. J. S. et al., Surface oxygen vacancy defects induced $CoTiO_{3-x}$ perovskite nanostructures for highly efficient catalytic activity from acidic and seawater electrolysis, *Results Phys.*, 2023, 44, 106179; and Mohamed, M. J. S. et al., Exceptional co-catalysts free $SrTiO_3$ perovskite coupled CdSe nanohybrid catalyst by green pulsed laser ablation for electrochemical hydrogen evolution reaction, *Chem. Eng. J. Adv.*, 2022, 11, 100344, which are incorporated herein by references in their entirety]. In brief, 600 milligrams (mg) of p-ZnO powder is weighed and dispersed in 10 mL of isopropanol. The mixture underwent sonication for 15 minutes to achieve a consistent dispersion. While undergoing laser beam irradiation, the mixture was continuously agitated using a magnetic stirrer. Following 60 minutes of laser beam irradiation, the solution changed to a shade of greyish black, resulting in a black-ZnO defect due to surface $O_2$ vacancies. The resulting solid was isolated using a vacuum filtration system, subjected to several washes with an ethanol-DI water mixture, and then desiccated at 80° C. for 24 h. From here on, this solid will be referred to as b-$ZnO_{vac}$.

The technique involves using ultrasonication to prepare biowaste-carbon@black-$ZnO_{vac}$ (ppCx@b-$ZnO_{vac}$), where x is the amount of biowaste-carbon (i.e., ppC) used (5, 10, or 15 mg). First, 100 mg of b-$ZnO_{vac}$ powder was measured and combined with 10 mL of DI water. After that, 5 mg of ppC was added to the mixture. The mixture underwent sonication for 60 minutes using an ultrasonicator to achieve a homogeneous dispersion. The resulting solid was isolated using a vacuum filtration system, subjected to several washes with an ethanol-DI water mixture, and then desiccated at 80° C. for 24 h. From here on, the nanostructures involving 5 mg of biowaste-carbon@black-$ZnO_{vac}$ will be referred to as ppC$_5$@b-$ZnO_{vac}$. In the same procedure above, various quantities of ppC (10 mg and 15 mg) were added to b-$ZnO_{vac}$. Consequently, these samples were labelled as ppC$_{10}$@b-$ZnO_{vac}$ and ppC$_{15}$@b-$ZnO_{vac}$, respectively.

Example 3: Characterization

The crystallinity of ppCx@b-$ZnO_{vac}$ nanostructures was examined using a Rigaku X-ray diffractometer (XRD) at 30 kilovolts (kV) and 30 milliamperes (mA), using Cu-K$\alpha$ radiation (2=1.5406 Å), and scanning was performed at a rate of 4° per minute, within a range of 2$\theta$=5-80°. The microstructures and morphologies of the ppCx@b-ZnO$_{vac}$ nanostructures were investigated using scanning electron microscopy (SEM) and transmission electron microscopy (TEM), which were accomplished using JEOL equipment. The elements obtained in the ppC$_x$@b-ZnO$_{vac}$ nanostructures were identified and mapped using energy-dispersive X-ray (EDX) spectroscopy combined with SEM. X-ray photoelectron spectroscopy (XPS) spectra of the ppC$_x$@b-ZnO$_{vac}$ nanostructures were obtained using a PHI 5000 Versa Probe II spectrophotometer (Physical Electronics Inc., USA) with an Al-Ka radiation (hv=1486.6 eV). The C 1s line, with a binding energy of 284.6 eV, was utilized as a reference to determine the presence of adventitious carbon. The optical absorption spectra (JASCO V-650) of the ppC$_x$@b-ZnO$_{vac}$ nanostructures were determined using a diffuse reflectance spectroscopy (DRS) method with measured wavelengths ranging from 200 to 800 nm. The photoluminescence (PL) emission spectra of the ppC$_x$@b-ZnO$_{vac}$ nanostructures were measured using a JASCO FP-8500 spectrophotometer, and the samples were excited using a xenon lamp with a wavelength of 335 nm. Electron paramagnetic resonance (EPR) spectra of the ppC$_x$@b-ZnO$_{vac}$ nanostructures were performed with an EPR ELEX-SYS E500 spectrometer (Bruker, Germany) at room temperature.

Example 4: Photocatalytic Hydrogen Production Experiments

Photocatalytic efficacy of the ppC$_x$@b-ZnO$_{vac}$ nanostructures in producing hydrogen were determined when exposed to visible light. The experiments were performed in a quartz container. Methanol acts as a sacrificial substance that acts as a hole scavenger. 20 mg of ppC$_x$@b-ZnO$_{vac}$ nanostructures were mixed with 100 mL of a 20% methanol solution in the quartz container. The resultant solution was vigorously agitated in a controlled atmosphere away from light for 30 minutes to reach adsorption-desorption equilibrium. The reactor's atmosphere was fully replaced by a continuous purge using nitrogen gas throughout the experiment. The resultant solution was then irradiated with a 300-W xenon lamp emitting light at 400 nm for 4 h. A magnetic stirrer was used to agitate the solution concurrently. Hydrogen produced was collected and examined using a gas chromatograph (GC) equipped with a thermal conductivity detector (TCD) and flame ionization detector (FID), with nitrogen acting as the carrier gas. In addition, the nanostructures' durability was tested by repeatedly producing hydrogen with the photocatalyst. After 4 h, the hydrogen produced was collected, and the same procedure was repeated for another cycle.

Figure 2A:
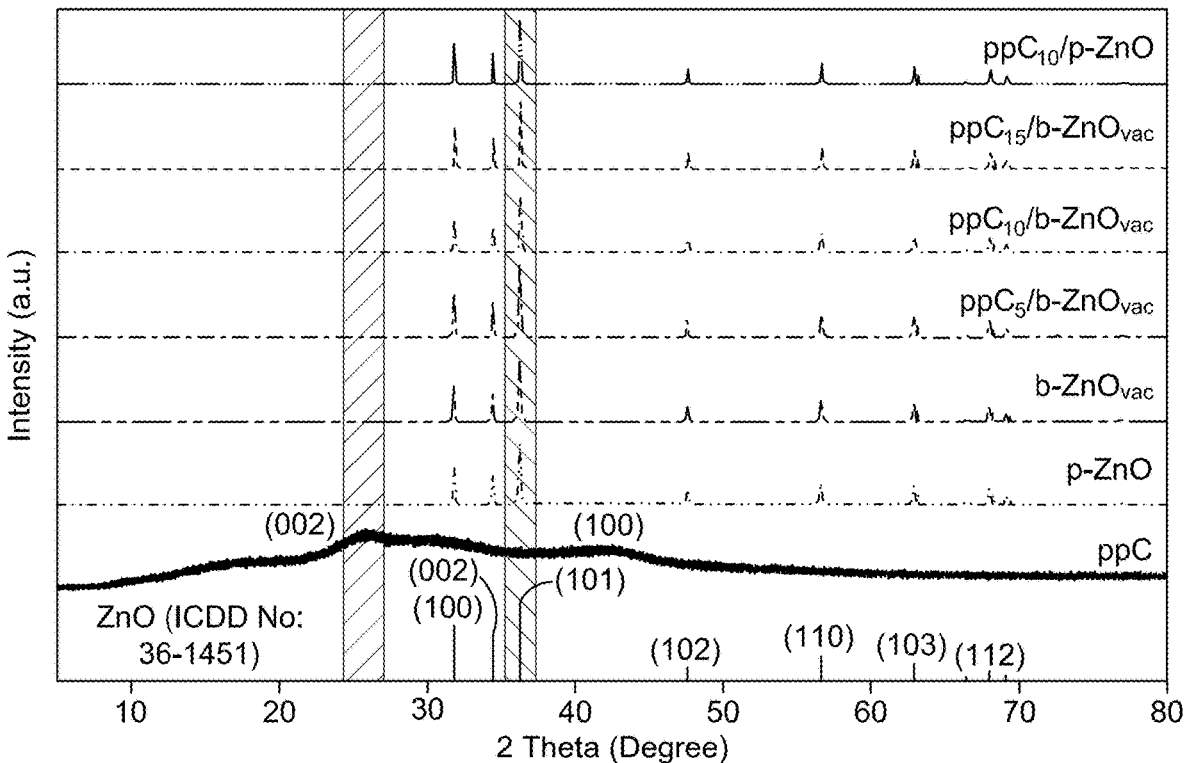
FIG. 2A depicts X-ray diffraction (XRD) patterns of pineapple peel biowaste (ppC), pure zinc oxide (p-ZnO), b-ZnO$_{vac}$, ppC$_5$@b-ZnO$_{vac}$, ppC$_{10}$@b-ZnO$_{vac}$, ppC$_{15}$@b-ZnO$_{vac}$, and ppC$_{10}$@p-ZnO, according to certain embodiments.
Figures 2B, 2C:
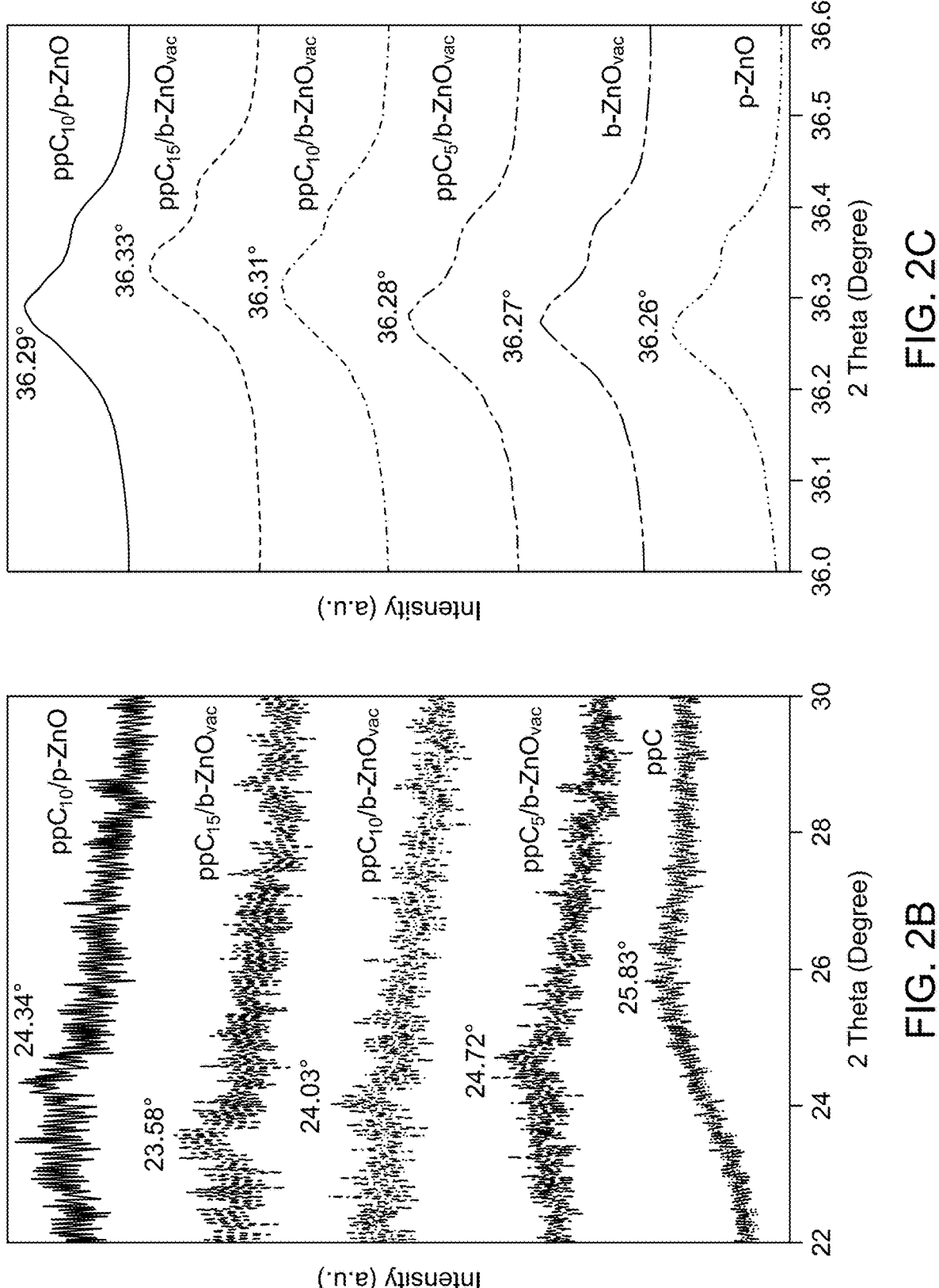
FIG. 2B depicts an enlarged view of XRD patterns of a carbon peak for ppC, ppC$_5$@b-ZnO$_{vac}$, ppC$_{10}$@b-ZnO$_{vac}$, ppC$_{15}$@b-ZnO$_{vac}$, and ppC$_{10}$@p-ZnO, according to certain embodiments.
FIG. 2C depicts an enlarged view of XRD patterns of a p-ZnO (101) peak for ppC, p-ZnO, b-ZnO$_{vac}$, ppC$_5$@b-ZnO$_{vac}$, ppC$_{10}$@b-ZnO$_{vac}$, ppC$_{15}$@b-ZnO$_{vac}$, and ppC$_{10}$@p-ZnO, according to certain embodiments.

XRD analysis was used to study the crystallinity and phase purity of ppC, p-ZnO, b-ZnO$_{vac}$, ppC$_5$@b-ZnO$_{vac}$, ppC$_{10}$@b-ZnO$_{vac}$, ppC$_{15}$@b-ZnO$_{vac}$, and ppC$_{10}$@p-ZnO, as shown in FIGS. 2A-2C. The ppC spectrum shows prominent peaks at 20=25.83° and 42.11°, representing the (002) and (100) planes of carbon, respectively [Tang, L. Wang, et al., Preparation, structure, and electrochemical properties of reduced graphene sheet films Adv. Funct. Mater., 2009, 19, 2782-2789, which is incorporated herein by reference in its entirety]. The spectrum of p-ZnO displayed several prominent peaks at specific angles due to Bragg's diffraction occurring from distinct crystal planes of ZnO (International Centre for Diffraction Data (ICDD) No. 36-1451) [Kang, W. et al., The effects of ZnO morphology on photocatalytic efficiency of ZnO/RGO nanocomposites, *Appl. Surf. Sci.*, 2016, 360, 270-275, which is incorporated herein by reference in its entirety]. In addition, b-ZnO$_{vac}$ maintained the p-ZnO crystal phase even after being exposed to laser beam irradiation, indicating that the laser beam irradiation had little impact on the crystal phase. The peaks at 36.26° in the p-ZnO material exhibited a minor shift towards a higher diffraction angle, indicating the presence of surface O$_2$ vacancy defects in b-ZnO$_{vac}$. The creation of surface O$_2$ vacancies may be attributed to the shift in results, demonstrating the presence of lattice disorder defects in b-ZnO$_{vac}$ [Zhang, N. et al. Black-colored ZnO nanowires with enhanced photocatalytic hydrogen evolution, *Nanotechnol.*, 2016, 27, 22LT01, which is incorporated herein by reference in its entirety]. Complete characteristic peaks in the ppC$_x$@b-ZnO$_{vac}$ nanostructures were identified. The characteristic peaks at 25.83° in the ppC are changed to 23.58° in the ppC$_x$@b-ZnO$_{vac}$ nanostructures. The 20 measurement of the (101) characteristic peak is shifted from 36.26° (p-ZnO) to 36.33° (ppC$_x$@b-ZnO$_{vac}$ nanostructures). These modifications may be ascribed to the creation of surface O$_2$ vacancy defects in b-ZnO$_{vac}$ and the incorporation of ppC into the structure of b-ZnO$_{vac}$ via a chemical bond at the Zn—C and/or Zn—O—C interface. The presence of these defects and their interactions provides an advantage for catalytic processes [Mohamed, M. J. S. et al. Facile synthesis of surface oxygen vacancy and Ti$^{3+}$ defects in SrTiO$_3$ perovskite coupled g-C$_3$N$_4$ decorated with Au ternary nanocomposites for enhancing electrocatalytic activity from acidic and natural seawater conditions *Int. J. Hydrogen Energy*, 2024, 54, 1436-1448, which is incorporated herein by reference in its entirety].

Figure 3A:
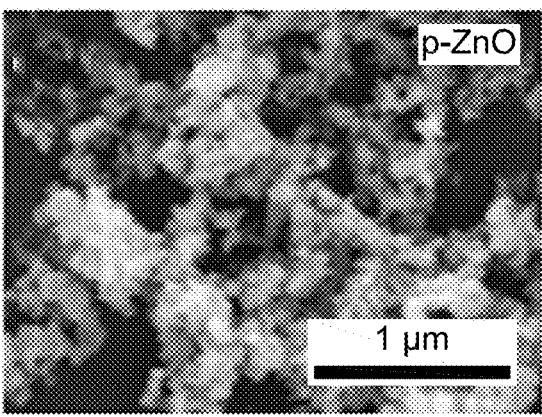
FIG. 3A is a scanning electron microscopy (SEM) image of p-ZnO with a scale of 1 micrometre (μm), according to certain embodiments.
Figure 3B:
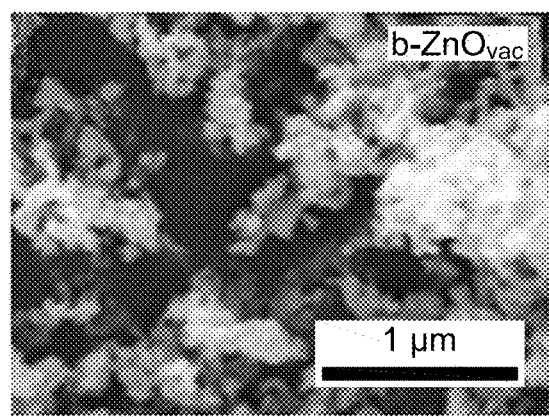
FIG. 3B is an SEM image of b-ZnO$_{vac}$ with a scale of 1 μm, according to certain embodiments.
Figure 3C:
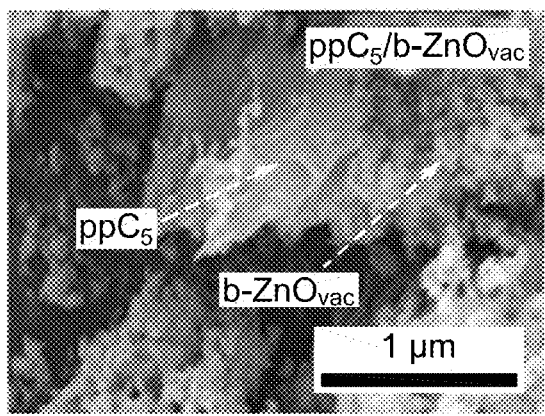
FIG. 3C is an SEM image of ppC$_5$@b-ZnO$_{vac}$ with a scale of 1 μm, according to certain embodiments.
Figure 3D:
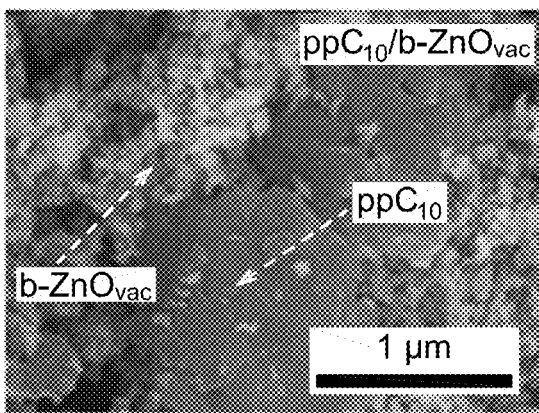
FIG. 3D is an SEM image of ppC$_{10}$@b-ZnO$_{vac}$ with a scale of 1 μm, according to certain embodiments.
Figure 3E:
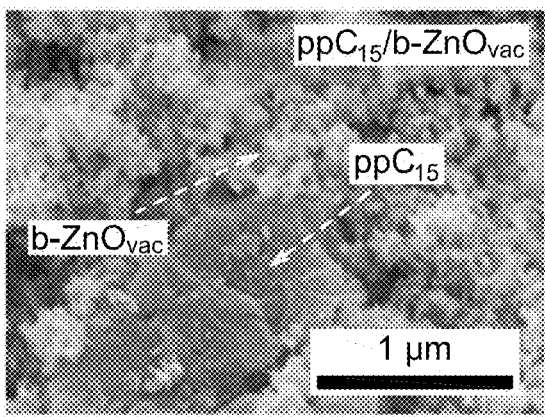
FIG. 3E is an SEM image of ppC$_{15}$@b-ZnO$_{vac}$ with a scale of 1 μm, according to certain embodiments.
Figure 3F:
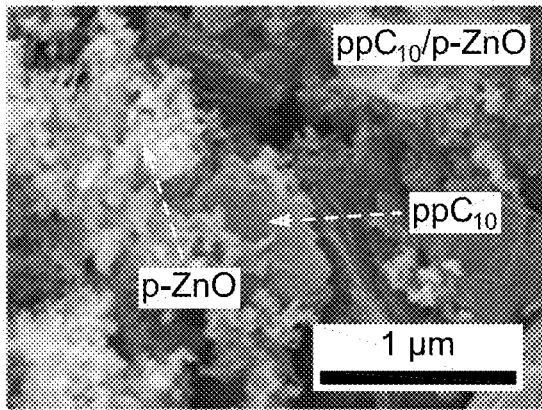
FIG. 3F is an SEM image of ppC$_{10}$@p-ZnO with a scale of 1 μm, according to certain embodiments.
Figure 4A:
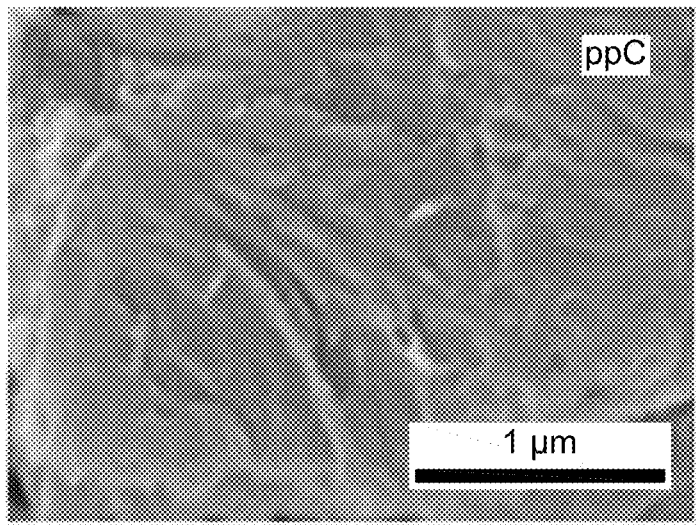
FIG. 4A is an SEM image of ppC with a scale of 1 μm, according to certain embodiments.
Figure 4B:
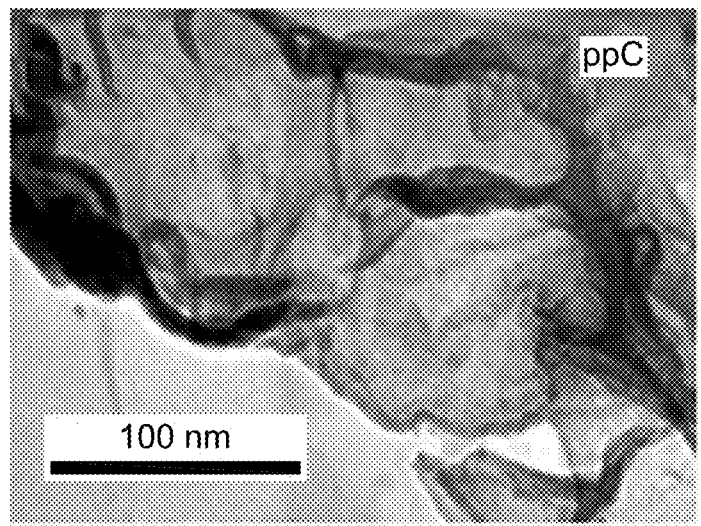
FIG. 4B is a transmission electron microscopy (TEM) image of ppC with a scale of 100 nanometers (nm), according to certain embodiments.
Figure 4C:
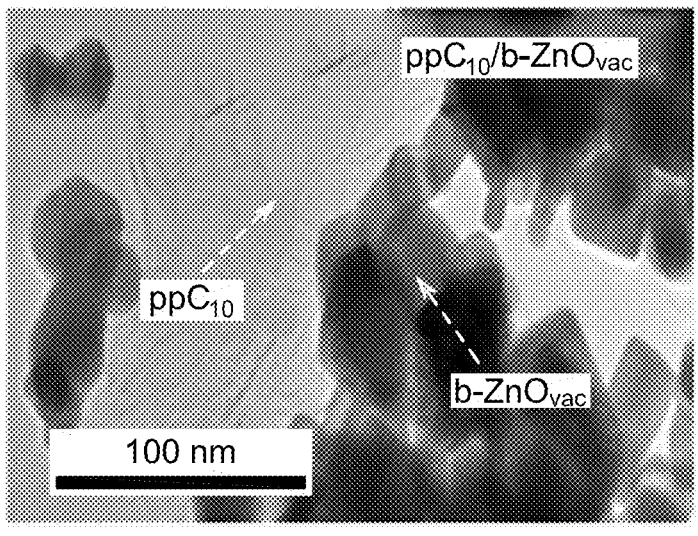
FIG. 4C is a TEM image of ppC$_{10}$@b-ZnO$_{vac}$ with a scale of 100 nm, according to certain embodiments.
Figure 4D:
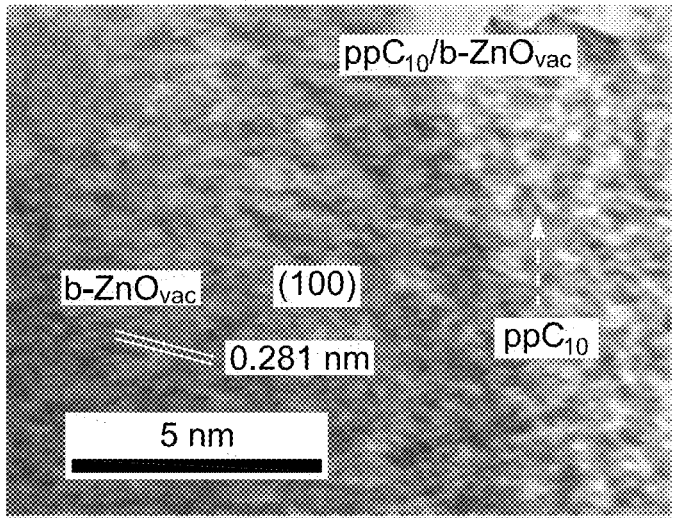
FIG. 4D is a high-resolution transmission electron microscopy (HR-TEM) image of ppC$_{10}$@b-ZnO$_{vac}$ with a scale of 5 nm, according to certain embodiments.
Figure 5A:
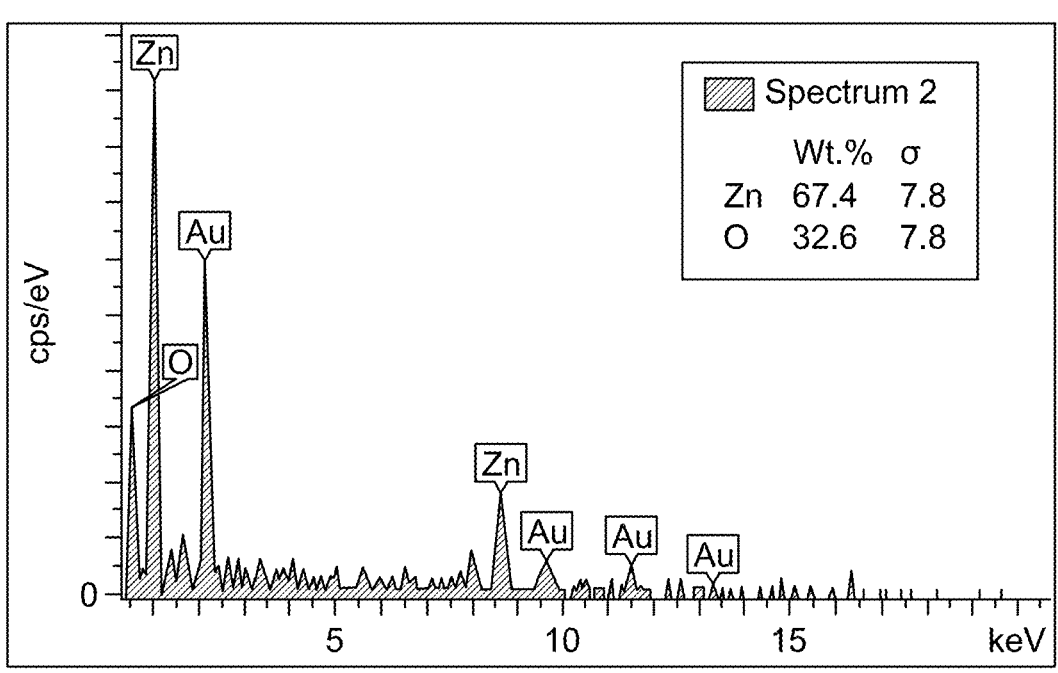
FIG. 5A is an energy-dispersive X-ray (EDX) analysis of b-ZnO$_{vac}$ nanoparticles, according to certain embodiments.
Figure 5B:
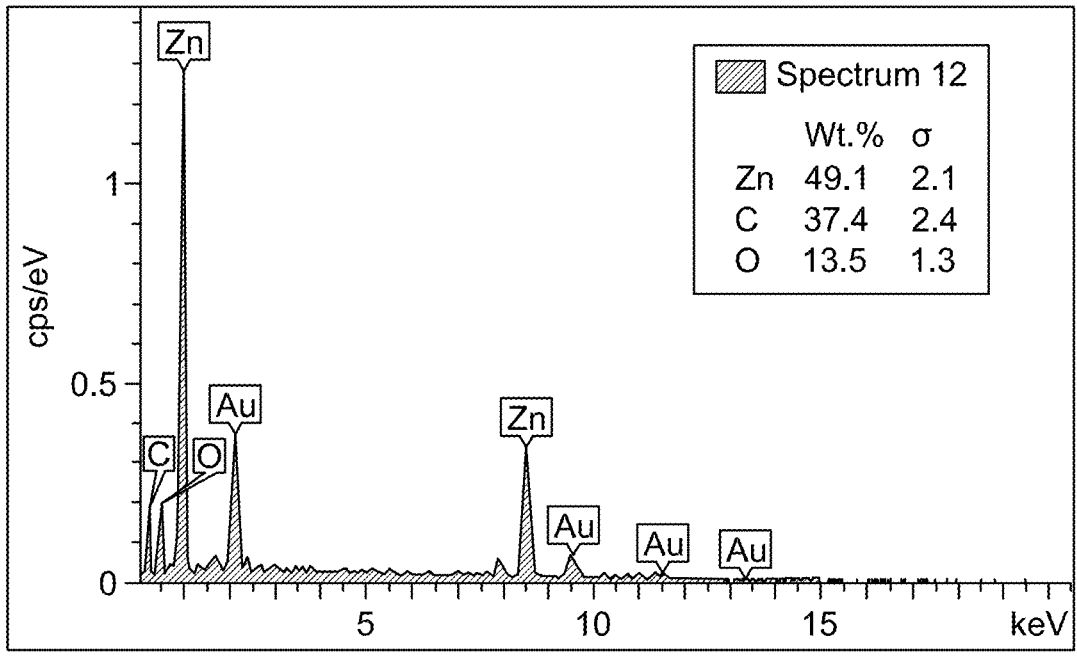
FIG. 5B is an EDX analysis of ppC$_{10}$@b-ZnO$_{vac}$, according to certain embodiments.
Figure 5C:
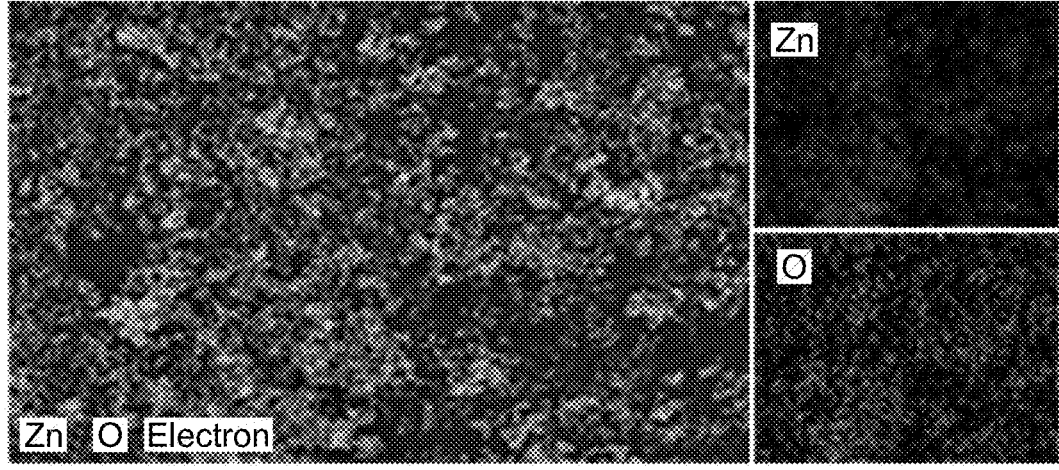
FIG. 5C depicts an elemental composition of b-ZnO$_{vac}$ for zinc (Zn) and oxygen (O), according to certain embodiments.
Figure 5D:
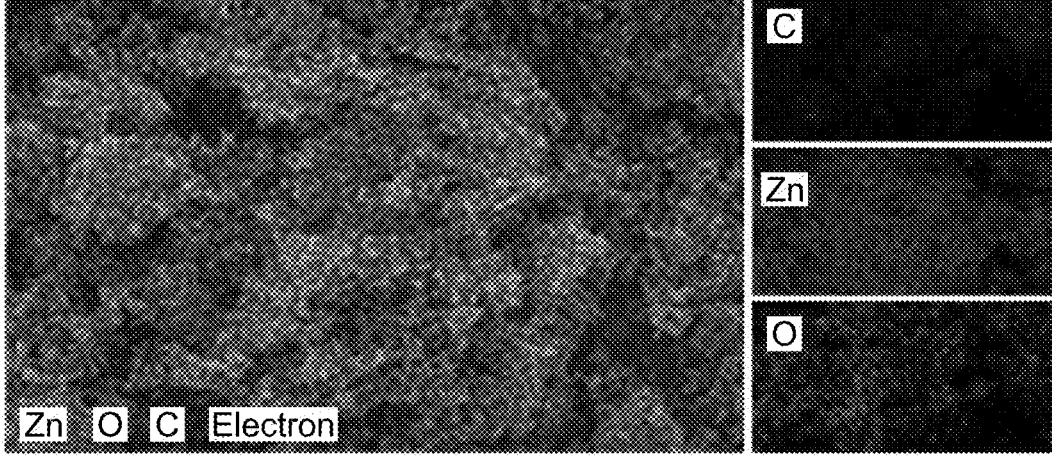
FIG. 5D depicts an elemental composition of ppC$_{10}$@b-ZnO$_{vac}$ for carbon @, Zn, and O, according to certain embodiments.

SEM analysis was used to study the morphology of ppC, p-ZnO, b-ZnO$_{vac}$, ppC$_5$@b-ZnO$_{vac}$, ppC$_{10}$@b-ZnO$_{vac}$, ppC$_{15}$@b-ZnO$_{vac}$, and ppC$_{10}$@p-ZnO. SEM images of p-ZnO (FIG. 3A) and b-ZnO$_{vac}$ (FIG. 3B) demonstrate that the ZnO particles possess an irregular polyhedral structural shape and are clustered together to form bigger agglomerates. FIGS. 3C-3F demonstrates complete wrapping of b-ZnO$_{vac}$ with the ppC sheets, obtaining a robust and dependable interaction between b-ZnO$_{vac}$ and ppC. FIG. 4A demonstrates that the ppC has a sheet-like structure with bigger clusters. A detailed analysis of the structure of ppC (FIG. 4B) and ppC$_{10}$@b-ZnO$_{vac}$ (FIG. 4C) was executed using TEM. The ppC exhibited a sheet-like form, whereas the ppC$_{10}$@b-ZnO$_{vac}$ had a polyhedral structure of the b-ZnO$_{vac}$ particles wrapped in ppC sheets. These findings indicate a strong binding between the ppC and b-ZnO$_{vac}$ particles, with small clusters being seen. Furthermore, FIG. 4D is an HR-TEM image of ppC$_{10}$@b-ZnO$_{vac}$ exhibiting visible lattices and crystallinity. The measured lattice-fringe has a d-spacing of 0.281 nm, matching to the (100) crystal plane of b-ZnO$_{vac}$. HR-TEM studies support the creation of a well-defined interaction between the ppC and b-ZnO$_{vac}$, resulting in amended electron transport through the photocatalytic process.

EDX spectra depicted in FIGS. 5A-5D further confirm that the b-ZnO$_{vac}$ and ppC$_{10}$@b-ZnO$_{vac}$ nanostructures comprise carbon (C), zinc (Zn), and oxygen (O), which is reliable with the results from XPS investigation (FIGS. 6A-6D). In addition, EDX mapping was used to assess the configuration of elements in the b-ZnO$_{vac}$ and ppC$_{10}$@b-ZnO$_{vac}$ nanostructures, as shown in FIGS. 5A-5D. FIGS. 5A-5D depicts a homogeneous dispersal of C, Zn, and O constituents in the b-ZnO$_{vac}$ and ppC$_{10}$@b-ZnO$_{vac}$ samples. The elemental maps further support effective integration of ppC and b-ZnO$_{vac}$ into the ppC$_{10}$@b-ZnO$_{vac}$ nanostructures.

FIGS. 6A-6D display outcomes of XPS studies on the p-ZnO, b-ZnO$_{vac}$, and ppC$_{10}$@b-ZnO$_{vac}$ nanostructures to acquire the composition, chemical bonding, and oxidation states of the elements present in the nanostructure. The survey spectrum of ppC, p-ZnO, b-ZnO$_{vac}$, and ppC$_{10}$@b-ZnO$_{vac}$ nanostructures (FIG. 6A) revealed the existence of C 1s, Zn 2p, and O 1s elements. In ppC, the C 1s peak (FIG. 6B) displays asymmetry and can be deconvoluted into three peaks at 284.62 eV, 285.73 eV, and 289.11 eV, which represent C—C, C—O, and C═O bonds, respectively [Gang, R. et al. Facile one-step production of 2D/2D ZnO/rGO nanocomposites under microwave irradiation for photocatalytic removal of tetracycline, *ACS Omega,* 2021, 6, 3831-3839, which is incorporated herein by reference in its entirety].

Figures 6A, 6B:
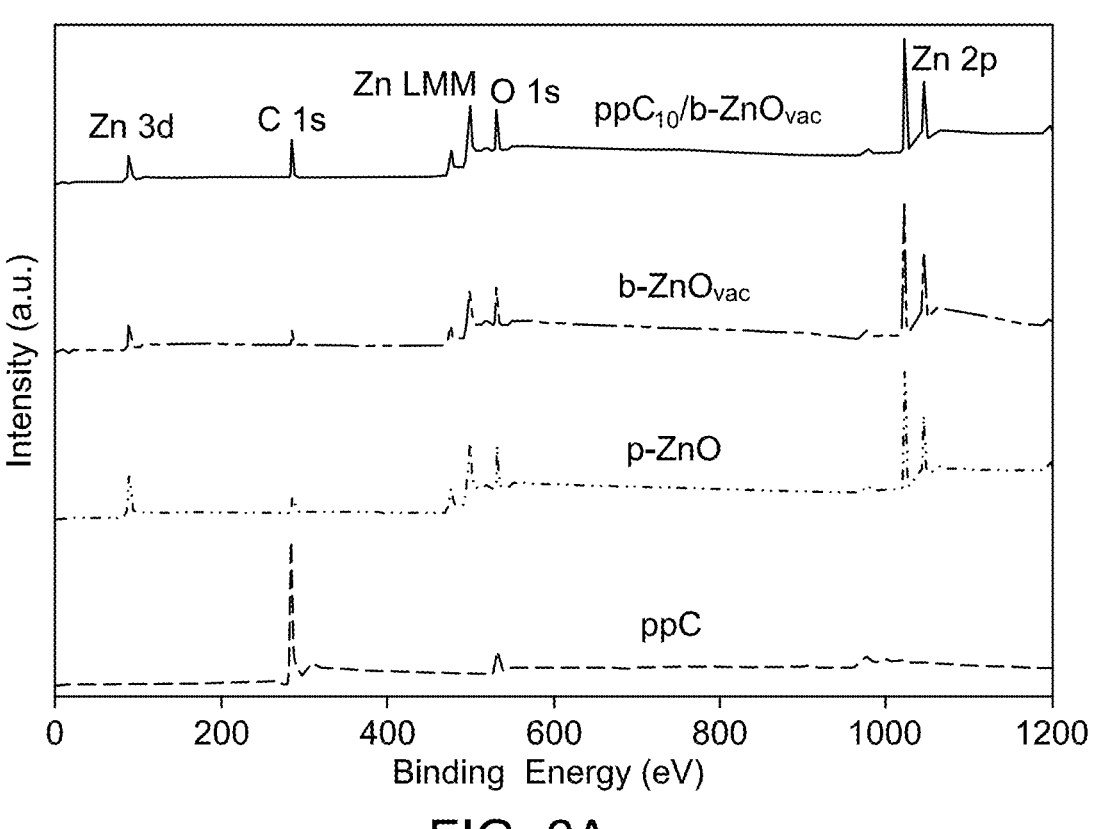
FIG. 6A depicts a survey scan of an X-ray photoelectron spectroscopy (XPS) of ppC, p-ZnO, b-ZnO$_{vac}$, and ppC$_{10}$@b-ZnO$_{vac}$, according to certain embodiments.
FIG. 6B depicts a high-resolution XPS spectra for C Is of ppC and ppC$_{10}$@b-ZnO$_{vac}$, according to certain embodiments.
Figure 6C:
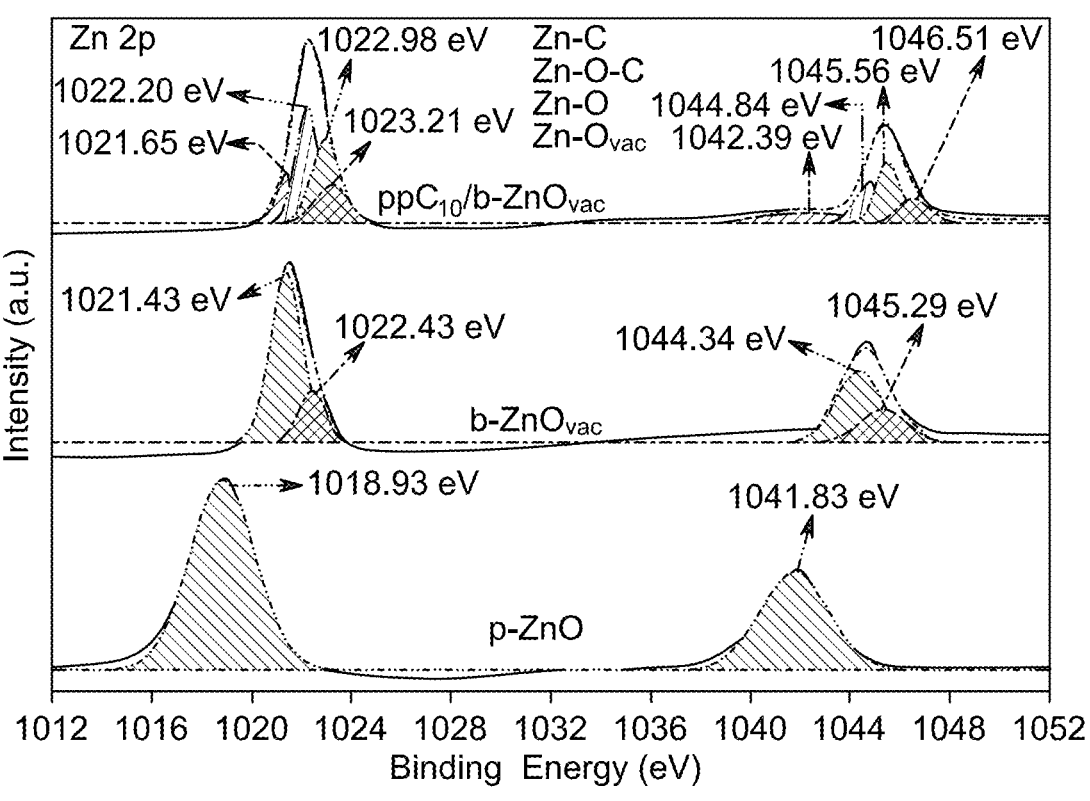
FIG. 6C depicts a high-resolution XPS spectra for Zn 2p of p-ZnO, b-ZnO$_{vac}$, and ppC$_{10}$@b-ZnO$_{vac}$, according to certain embodiments.

In p-ZnO, FIG. 6C shows Zn 2p double peaks at about 1041.83 eV and 1018.93 eV, corresponding to the Zn 2p$_{1/2}$ and Zn 2p$_{3/2}$ states, respectively. The binding energy difference between the Zn 2p$_{1/2}$ and Zn 2p$_{3/2}$ is about 22.90 eV, indicating that the Zn$^{2+}$ state is in its normal condition [Moussa, H. et al., ZnO rods/reduced graphene oxide composites prepared via a solvothermal reaction for efficient sunlight-driven photocatalysis, *Appl. Catal. B: Environ.,* 2016, 185, 11-21, which is incorporated herein by reference in its entirety].

Figure 6D:
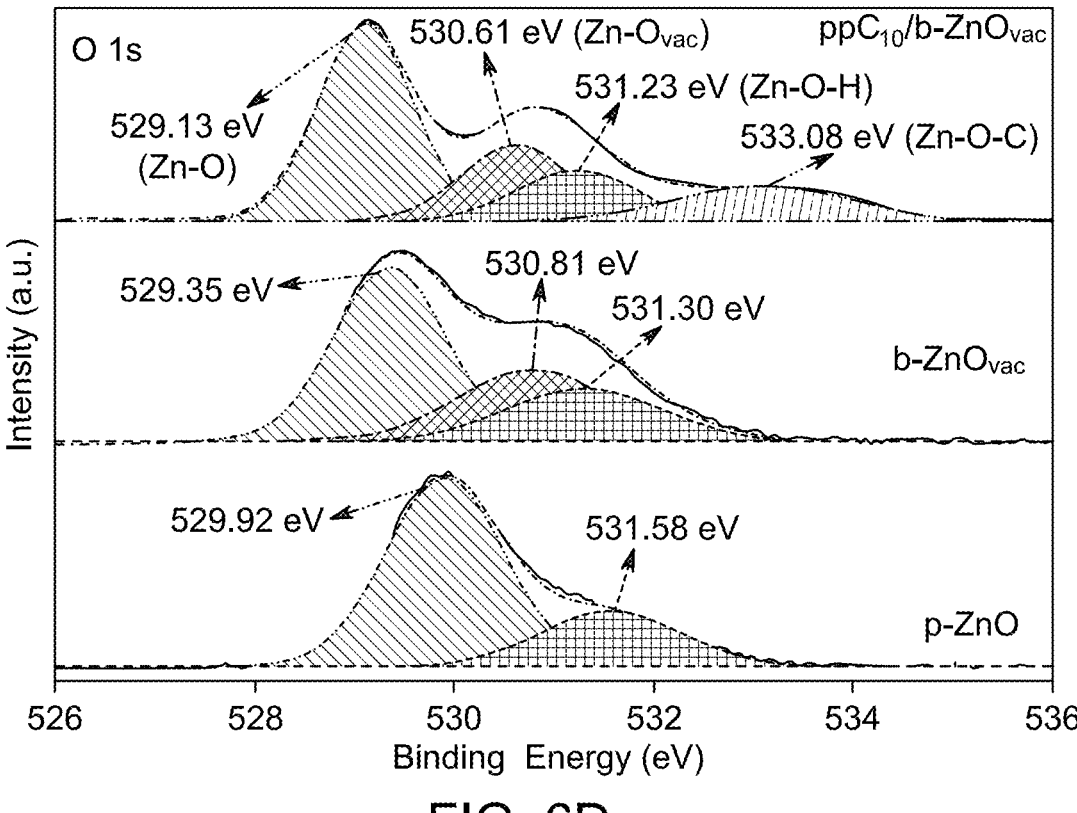
FIG. 6D depicts a high-resolution XPS spectra for O 1s of p-ZnO, b-ZnO$_{vac}$, and ppC$_{10}$@b-ZnO$_{vac}$, according to certain embodiments.

FIG. 6D displays O 1s of two peaks at 529.92 eV and 531.58 eV, ascribed to the Zn—O and —OH groups, respectively [Mishra, D. K. et al., Carbon doped ZnO: Synthesis, characterization and interpretation, *J. Magn. Magn. Mater.,* 2013, 329, 146-152, which is incorporated herein by reference in its entirety]. The spectra of b-ZnO$_{vac}$ (as seen in FIGS. 6C-6D) exhibit that the binding energy of the O 1s peaks decreases while the Zn 2p peak increases in binding energy when compared to p-ZnO. The O 1s spectrum showed a new peak at 530.81 eV, whereas the Zn 2p spectrum showed peaks at 1022.43 eV and 1045.29 eV. These findings indicate the presence of surface O$_2$ vacancy defects in b-ZnO$_{vac}$ [Vijayaraghavan R., Chemical manipulation of oxygen vacancy and antibacterial activity in ZnO, *Mater. Sci. Eng. C.,* 2017, 77, 1027-1034; and Badreldin, A. et al., Local surface modulation activates metal oxide electrocatalyst for hydrogen evolution: synthesis, characterization, and DFT study of novel black ZnO, *ACS Appl. Energy Mater.,* 2020, 3, 10590-10599, which are incorporated herein by references in their entireties]. Further, ppC$_{10}$@b-ZnO$_{vac}$ spectra (as seen in FIGS. 6B-6D) show a decrease in the binding energies of the C 1s and O 1s peaks, while the Zn 2p peak shows an increase in binding energy. During the synthesis process, carbon partially substitutes oxygen and forms Zn—C and Zn—O—C bonds, as seen in FIGS. 6B-6D. The C Is spectra revealed the presence of two additional peaks at 283.63 eV and 292.36 eV, providing evidence for forming Zn—C and Zn—O—C bonds [Rakkesh, R. A. et al., Efficient sunlight-driven photocatalytic activity of chemically bonded GNS—TiO$_2$ and GNS—ZnO heterostructures, *J. Mater. Chem. C.,* 2014, 2, 6827-6834, which is incorporated herein by reference in its entirety]. A newly identified peak at 533.08 eV was seen in the O 1s spectra, indicating the presence of a Zn—O—C bond [Gang, R. et al., Facile one-step production of 2D/2D ZnO/rGO nanocomposites under microwave irradiation for photocatalytic removal of tetracycline, *ACS Omega,* 2021, 6, 3831-3839, which is incorporated herein by reference in its entirety]. The Zn 2p spectra revealed new peaks at 1021.65 eV and 1022.20 eV, indicating Zn—C and Zn—O—C connections. The observed changes may be ascribed to incorporating ppC into the crystal structure of b-ZnO$_{vac}$

[Alshammari, A. S. et al., Visible-light photocatalysis on C-doped ZnO derived from polymer-assisted pyrolysis, RSC Adv., 2015, 5, 27690-27698, which is incorporated herein by reference in its entirety]. The XPS results support the occurrence of a contact between ppC and b-ZnO$_{vac}$, as exposed by the formation of a chemically bonded Zn—C and Zn—O—C interface. This interaction facilitates the efficient transport of carriers from b-ZnO$_{vac}$ to ppC, leading to enhanced charge carrier separation and improved photocatalytic performance.

Figure 7A:
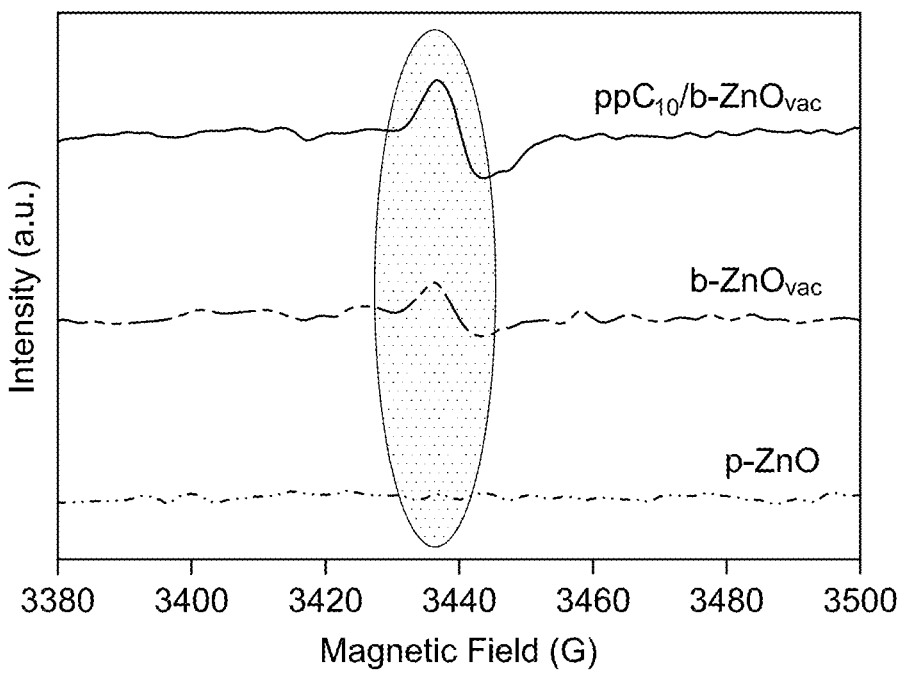
FIG. 7A depicts electron paramagnetic resonance of p-ZnO, b-ZnO$_{vac}$, and ppC$_{10}$@b-ZnO$_{vac}$, according to certain embodiments.
Figure 7B:
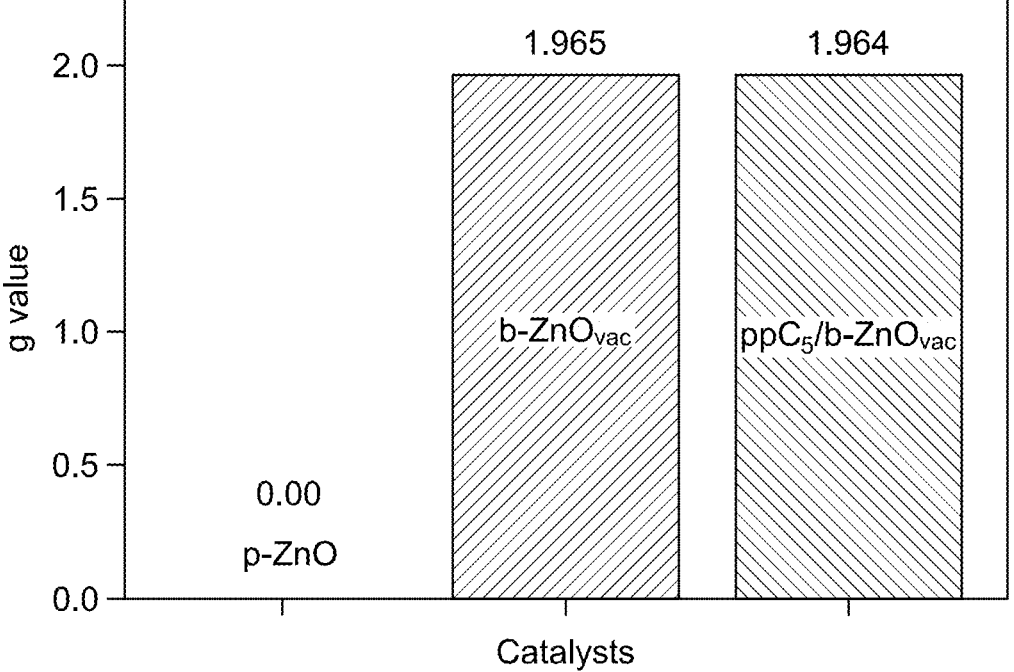
FIG. 7B shows g values of p-ZnO, b-ZnO$_{vac}$, and ppC$_{10}$@b-ZnO$_{vac}$, according to certain embodiments.

Electron paramagnetic resonance (EPR) spectra of p-ZnO, b-ZnO$_{vac}$, and ppC$_{10}$@b-ZnO$_{vac}$ nanostructures were obtained to investigate the formation of O$_2$ vacancies, as shown in FIGS. 7A-7B. The defect-free p-ZnO exhibits antiferromagnetic behavior, with no detectable signal in the EPR spectrum. The b-ZnO$_{vac}$ sample generates a strong EPR signal at g=1.965, which is identified as a single electron trapped in surface O$_2$ vacancies [Xia, T. et al., Hydrogenated black ZnO nanoparticles with enhanced photocatalytic performance, *RSC Adv.,* 2014, 4, 41654 41658, which is incorporated herein by reference in its entirety]. A surface O$_2$ vacancy will readily adsorb ambient O$_2$ molecules, which are subsequently reduced to O$_2^-$, thus producing an EPR signal at g=1.965 [Guo, H. L. et al., Oxygen deficient ZnO$_{1-x}$ nanosheets with high visible light photocatalytic activity, *Nanoscale,* 2015, 7, 7216-7223, which is incorporated herein by reference in its entirety]. Furthermore, the EPR intensity of ppC$_{10}$@b-ZnO$_{vac}$ nanostructures is higher than that of b-ZnO$_{vac}$, indicating an increase in the density state of conduction band electrons after the electron's donation from carbon atoms [Yu, J. et al., Facile synthesis of molecularly imprinted black TiO$_2$-x/carbon dots nanocomposite and its recognizable photocatalytic performance under visible-light, *Appl. Surf. Sci.,* 2021, 551, 149476, which is incorporated herein by reference in its entirety]. The EPR spectrum of ppC$_{10}$@b-ZnO$_{vac}$ shows a g-shift towards lower values at g=1.964 compared to that of b-ZnO$_{vac}$ (g=1.965), which is due to the formation of a chemical connection between ppC and b-ZnO$_{vac}$ via the Zn—C/Zn—O—C interaction with the localized electrons in the O$_2$ vacancy. These analysis results also confirm the existence of O$_2$ vacancy defects in b-ZnO$_{vac}$ as well as formation of a chemical connection between ppC and b-ZnO$_{vac}$ via Zn—C/Zn—O—C interactions, which can enhance visible light absorption and facilitate separation of photogenerated electron-hole pairs, thereby improving photocatalytic efficacy.

Figure 8A:
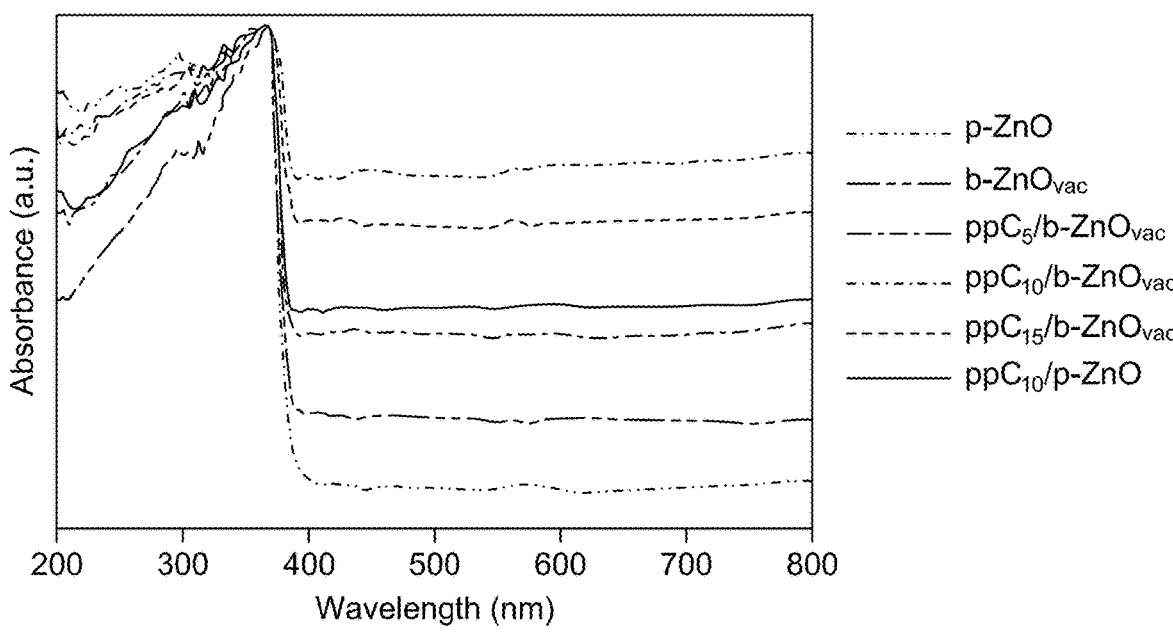
FIG. 8A depicts absorbance spectra of p-ZnO, b-ZnO$_{vac}$, ppC$_5$@b-ZnO$_{vac}$, ppC$_{10}$@b-ZnO$_{vac}$, ppC$_{15}$@b-ZnO$_{vac}$, and ppC$_{10}$@p-ZnO, according to certain embodiments.

FIG. 8A displays DRS spectra of the p-ZnO, b-ZnO$_{vac}$, ppC$_5$@b-ZnO$_{vac}$, ppC$_{10}$@b-ZnO$_{vac}$, ppC$_{15}$@b-ZnO$_{vac}$, and ppC$_{10}$@p-ZnO nanostructures. p-ZnO exhibits strong absorption at UV wavelengths, leading to the formation of electron-hole pairs. The UV light absorbance exhibited in the p-ZnO was shifted to a visible light absorbance area corresponding to b-ZnO$_{vac}$. The context of the metal oxide defect formation realm is a phenomenon called the Mars-van-Krevelen mechanism, which entails the creation of O$_2$ vacancies on the surface of metal oxides [Bao, H. Et al. Mars-van-Krevelen mechanism-based blackening of nano-sized white semiconducting oxides for synergetic solar photo-thermocatalytic degradation of dye pollutants, *Nanoscale,* 2020, 12, 4030-4039, which is incorporated herein by reference in its entirety]. Laser beam irradiation of p-ZnO induced surface O$_2$ defects, resulting in a black color. The occurrence of an O$_2$ defect on the surface leads to a reduction in the bandgap due to the presence of localized electronic states at the lower end of the conduction band [Choudhury, B. et al. Narrowing of band gap and effective charge carrier separation in oxygen deficient TiO$_2$ nanotubes with improved visible light photocatalytic activity, *J. Colloid Interface Sci.*, 2016, 465, 1-10, which is incorporated herein by reference in its entirety]. The electrons are confined inside localized electronic states formed by the $O_2$ defects, with these defect levels being between the valence and conduction bands [Liu, G. et al. Enhanced photoactivity of oxygen-deficient anatase $TiO_2$ sheets with dominant {001} facets, *J. Phys. Chem. C,* 2009, 113, 21784-21788, which is incorporated herein by reference in its entirety]

Addition of ppC to b-ZnO$_{vac}$ resulted in an increase in the absorption characteristics of ppC$_x$@b-ZnO$_{vac}$ nanostructures across the visible range when compared to b-ZnO$_{vac}$ alone, which is due to the high light absorption feature of ppC materials. The ppC acts as a photosensitizer because of its connection to the conduction band states of b-ZnO$_{vac}$. Incorporation of ppC into b-ZnO$_{vac}$ reduces the composite material's band gap, promoting the redshift of the light absorption boundary and extension to visible light. The ppC$_x$@b-ZnO$_{vac}$ nanostructures have a change in the radian of the bottom of the light absorption edge that may be ascribed to the existence of ppC centers on the surface of b-ZnO$_{vac}$, which may be due to the existence of $O_2$ vacancy defects in b-ZnO$_{vac}$ as well as the formation of a chemical connection between ppC and b-ZnO$_{vac}$ via Zn—C/Zn—O—C interactions. These findings demonstrate that ppC$_x$@b-ZnO$_{vac}$ nanostructures can boost visible light absorption by reducing band gaps and promoting photo-generated electron and hole separation at interfaces, thereby enhancing photocatalytic properties [Bai, X. et al., Photocatalytic degradation of deoxynivalenol using graphene/ZnO hybrids in aqueous suspension, *Appl. Catal. B,* 2017, 204, 11-20, which is incorporated herein by reference in its entirety].

Figure 8B:
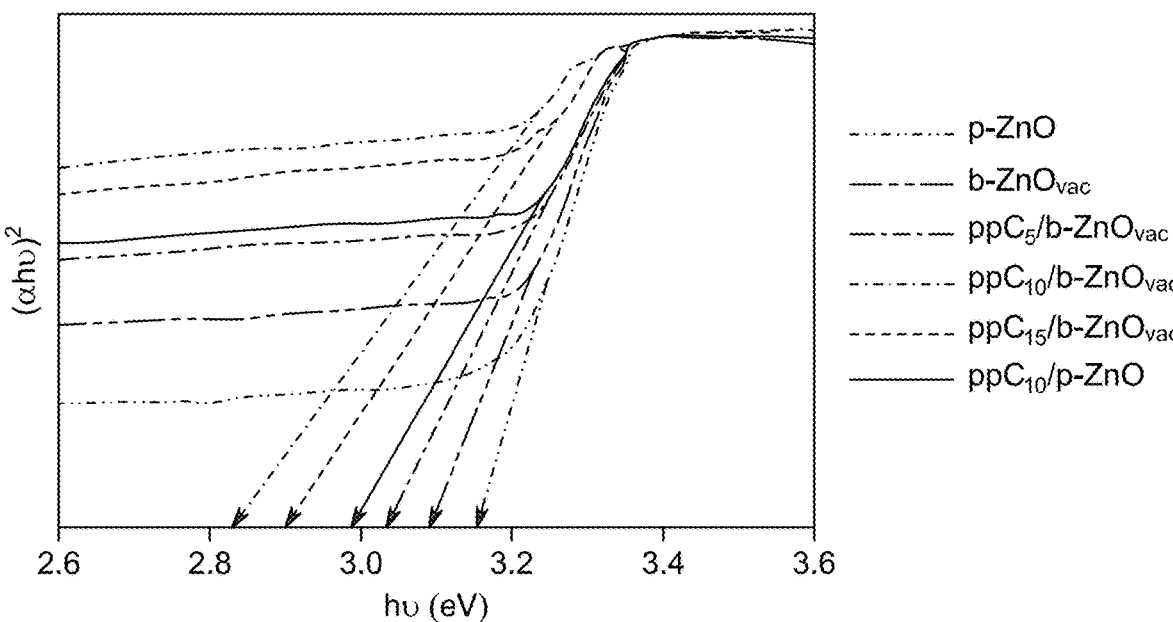
FIG. 8B depicts a band gap plot of p-ZnO, b-ZnO$_{vac}$, ppC$_5$@b-ZnO$_{vac}$, ppC$_{10}$@b-ZnO$_{vac}$, ppC$_{15}$@b-ZnO$_{vac}$, and ppC$_{10}$@p-ZnO, according to certain embodiments.
Figure 8C:
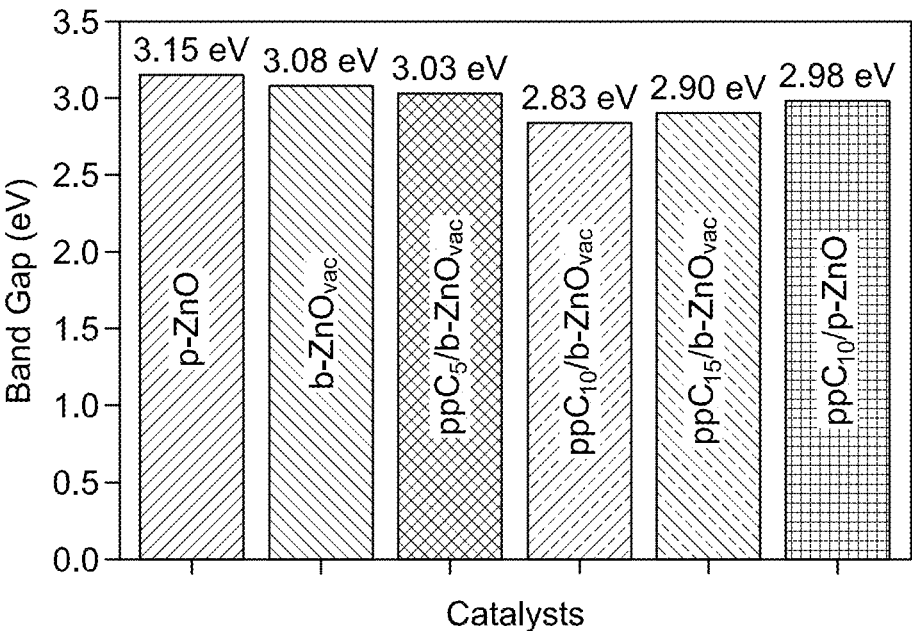
FIG. 8C shows a band gap histogram of p-ZnO, b-ZnO$_{vac}$, ppC$_5$@b-ZnO$_{vac}$, ppC$_{10}$@b-ZnO$_{vac}$, ppC$_{15}$@b-ZnO$_{vac}$, and ppC$_{10}$@p-ZnO, according to certain embodiments.
Figure 9:
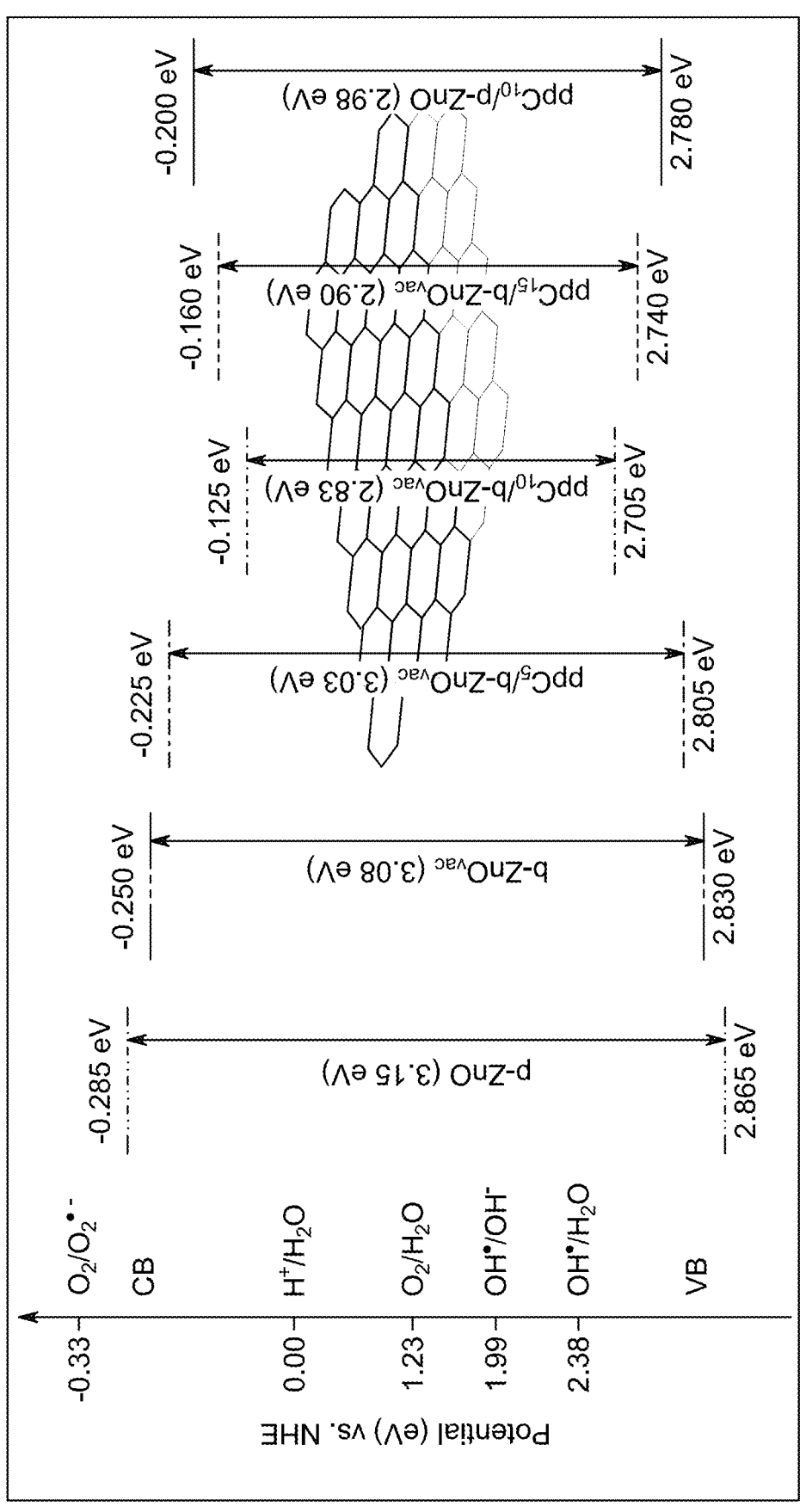
FIG. 9 depicts an energy band structure of p-ZnO, b-ZnO$_{vac}$, ppC$_5$@b-ZnO$_{vac}$, ppC$_{10}$@b-ZnO$_{vac}$, ppC$_{15}$@b-ZnO$_{vac}$, and ppC$_{10}$@p-ZnO, according to certain embodiments.

FIG. 8B illustrates bandgap energy (E$_g$) values of p-ZnO, b-ZnO$_{vac}$, ppC$_5$@b-ZnO$_{vac}$, ppC$_{10}$@b-ZnO$_{vac}$, ppC$_{15}$@b-ZnO$_{vac}$, and ppC$_{10}$@p-ZnO nanostructures using the Kubelka-Munk function [Gondal, M. A. and Mohamed, M. J. S., Synthesis of sulfur-encapsulated mullite structure Bi$^0$/Fe$^0$-Rich Bi$_2$Fe$_4$O$_{9-x}$ framework by advanced probe sonic approach applied for augmented electroactive hydrogen production, storage and photoactive degradation studies, *J. Alloys Compd.*, 2023, 978, 173323, which is incorporated herein by reference in its entirety]. The E$_g$ values for p-ZnO, b-ZnO$_{vac}$, ppC$_5$@b-ZnO$_{vac}$, ppC$_{10}$@b-ZnO$_{vac}$, ppC$_{15}$@b-ZnO$_{vac}$, and ppC$_{10}$@p-ZnO nanostructures are 3.15 eV, 3.08 eV, 3.03 eV, 2.83 eV, 2.90 eV, and 2.98 eV, respectively (refer to FIG. 8C). Band edge potential plays a role in influencing photogenerated carriers' separation, generation, and transition throughout the process. The band edge potential of the photocatalyst's valence band (E$_{VB}$) and conduction band (E$_{CB}$) edges were calculated using Mulliken's electronegativity function [Mohamed, M. J. S. et al., Novel NRGO-CoWO$_4$-Fe$_2$O$_3$ nanocomposite as an efficient catalyst for dye degradation and reduction of 4-nitrophenol, *Mater. Chem. Phys.*, 2018, 208, 112-122, which is incorporated herein by reference in its entirety], and the obtained values of E$_{VB}$ and E$_{CB}$ are shown in FIG. 9, respectively.

Figure 8D:
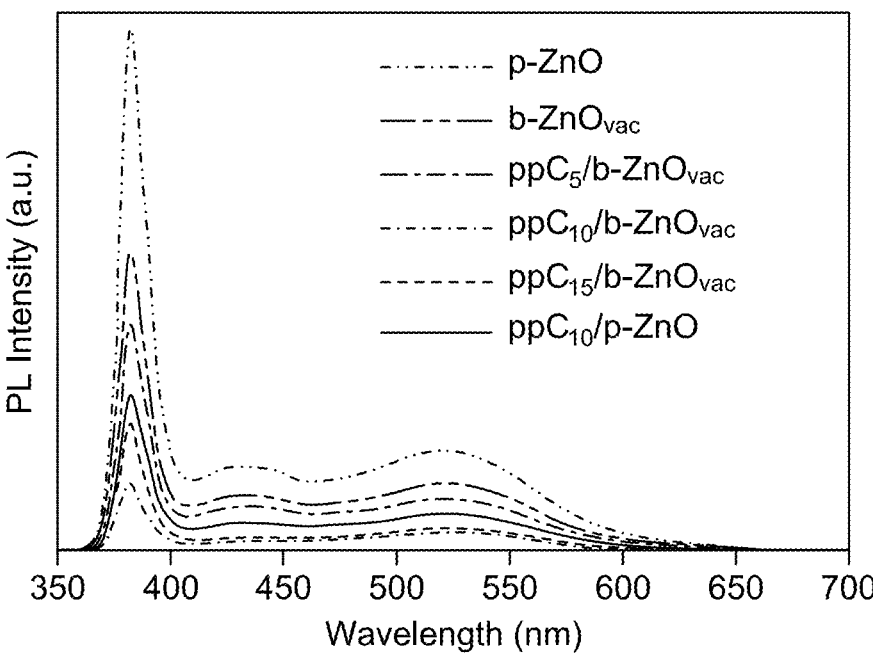
FIG. 8D depicts photoluminescence (PL) spectra of p-ZnO, b-ZnO$_{vac}$, ppC$_5$@b-ZnO$_{vac}$, ppC$_{10}$@b-ZnO$_{vac}$, ppC$_{15}$@b-ZnO$_{vac}$, and ppC$_{10}$@p-ZnO, according to certain embodiments.

The p-ZnO, b-ZnO$_{vac}$, ppC$_5$@b-ZnO$_{vac}$, ppC$_{10}$@b-ZnO$_{vac}$, ppC$_{15}$@b-ZnO$_{vac}$, and ppC$_{10}$@p-ZnO nanostructures were extensively analyzed to evaluate the effectiveness of charge separation and recombination of electrons via PL studies with an excitation wavelength of 335 nm. FIG. 8D displays the spectrum of the p-ZnO sample, showing three distinct peaks at wavelengths of 382 nm, 433 nm, and 522 nm, corresponding to blue and green emission zones. The high emission peaks at 382 nm in p-ZnO may be attributed to the transition near the ZnO band edge [Yang, P. et al., Constructing mesoporous g-C$_3$N$_4$/ZnO nanosheets catalyst for enhanced visible-light driven photocatalytic activity, *J. Photochem. Photobiol. A: Chem.*, 2020, 388, 112169, which is incorporated herein by reference in its entirety]. The two weaker peaks at around 433 nm and 522 nm are in the visible range, which can be attributed to the transition of Zn vacancy and defect complex, respectively [Singh, G. et al. ZnO decorated luminescent graphene as a potential gas sensor at room temperature, *Carbon,* 2012, 50, 385-394, which is incorporated herein by reference in its entirety]. Generally, materials containing $O_2$ vacancies have a strong affinity for oxygen, particularly in the vicinity of the $O_2$ vacancy sites. This process generates liberated electrons, resulting in a phenomenon known as band bending. The presence of band bending inhibits the recombination of excitons. Consequently, the magnitude of PL peaks diminishes [Lv, J. and Fang, M., Photoluminescence study of interstitial oxygen defects in ZnO nanostructures, Mater. Lett., 2018, 218, 18-21, which is incorporated herein by reference in its entirety]. When the laser is applied, the defect density of b-ZnO$_{vac}$ decreases gradually, leading to a fall in the strength of the PL peak. This indicated the existence of $O_2$ vacancy defects in b-ZnO$_{vac}$ [Meethal, B. N. et al., Anchoring of polymeric precursor on oxygen deficient ZnO nanotubes: A chelation assisted combined nucleation-growth-dissolution synthesis strategy, Mater. Des., 2017, 130, 426-432, which is incorporated herein by reference in its entirety]. The intensity of the peak at 382 nm, 433 nm, and 522 nm exhibits variation in the ppC$_x$@b-ZnO$_{vac}$ nanostructures, contingent upon the ppC to b-ZnO$_{vac}$ ratio. The PL intensity drops as the amount of ppC grows, indicating that the efficiency of isolating photo-generated charge is enhanced with a greater amount of ppC. The ppC$_{10}$@b-ZnO$_{vac}$ nanostructures display a decrease in PL intensity. The ppC$_{10}$@b-ZnO$_{vac}$ nanostructure has the greatest degree of charge separation among the different ppC$_x$@b-ZnO$_{vac}$ nanostructures. This process may occur due to the creation of $O_2$ vacancy defects in b-ZnO$_{vac}$ and merging ppC with b-ZnO$_{vac}$ via Zn—C/Zn—O—C interactions. Synergistic efforts of these nanostructures improve the material's facility to absorb visible light, accelerate electron transport, and reduce electron-hole pair recombination [Yashwanth, H. J. et al. Synergy between nitrogen, phosphorus co-doped carbon quantum dots and ZnO nanorods for enhanced hydrogen production, *J. Alloys Compd.*, 2023, 937, 168397, which is incorporated herein by reference in its entirety]. The photocatalytic process showed an enhancement.

The visible active photocatalytic efficiency of the ppC$_x$@b-ZnO$_{vac}$ nanostructures was evaluated for H$_2$ production using methanol as a sacrificial agent, as shown in FIG. 10A. The photocatalytic efficacy of the ppC$_{10}$@b-ZnO$_{vac}$ nanostructures is higher than that of p-ZnO only, demonstrating that both ppC and b-ZnO$_{vac}$ have an impact on the prepared nanostructures. ppC is recognized for its electron movement efficacy and electronic assembly, improving its photocatalytic capacity to produce H$_2$. In addition, the presence of $O_2$ vacancies in the b-ZnO$_{vac}$ defect level creates an extra pathway for electrons excited by the b-ZnO$_{vac}$ valence band. $O_2$ vacancies in the b-ZnO$_{vac}$ defect level can be used to improve visible light absorption and efficient separation of electron-hole pairs, resulting in an increasing photocatalytic H$_2$ production; therefore, the ppC$_x$@b-ZnO$_{vac}$ nanostructures enhance the effectiveness of photocatalysis when exposed to visible light. The prepared ppC$_x$@b-ZnO$_{vac}$ nanostructures use $O_2$ vacancy defects and Zn—C/Zn—O—C contact interfaces, highlighting the role of ppC and b-ZnO$_{vac}$ in the photocatalytic process. Photocatalytic activity peaked at a concentration of 10 mg (ppC), resulting in an $H_2$ generation rate of about 215.92 μmol $g^{-1}.h^{-1}$. This finding is greater when compared to ZnO/N-rGO having an $H_2$ generation rate of about 137 μmol·$g^{-1}$·$h^{-1}$ [Neena, D. et al., Fabrication of ZnO/N-rGO composite as highly efficient visible-light photocatalyst for 2, 4-DCP degradation and $H_2$ evolution, *Appl. Surf. Sci.*, 2019, 488, 611-619, which is incorporated herein by reference in its entirety] and vanadium-doped ZnO having an $H_2$ generation rate of about 112 μmol $g^{-1}$·$h^{-1}$ [Ahmad, I. et al., Microwave-assisted one-pot hydrothermal synthesis of V and La co-doped ZnO/CNTs nanocomposite for boosted photocatalytic hydrogen production, *Int. J. Hydrogen Energy*, 2022, 47, 15505-15515, which is incorporated herein by reference in its entirety]. Existence of $O_2$ vacancy defects in b-ZnO$_{vac}$ and strong synergistic interactions among ppC and b-ZnO$_{vac}$, via a chemically linked Zn—C/Zn—O—C interface, increase visible light absorption and promote separation of photogenerated electron-hole pairs, thereby improving photocatalytic performance. An improvement in the rate at which $H_2$ was produced during the process of methanol breakdown was observed; however, when the amount of ppC rose, the photoactivity of the ppC$_{15}$@b-ZnO$_{vac}$ nanostructures diminished. This may be attributable to a higher occurrence of defects in the photocatalyst nanostructures, which causes aggregation and limits the interaction between ppC and b-ZnO$_{vac}$.

The $H_2$ production rate of ppC$_{10}$@b-ZnO$_{vac}$ was measured at various monochromatic light wavelengths (380 nm, 400 nm, 450 nm, and 500 nm), as shown in FIG. 10B. When ppC$_{10}$@b-ZnO$_{vac}$ was exposed to UV light at 380 nm, it produced $H_2$ more efficiently at a rate of 241.82 μmol·$g^{-1}$·$h^{-1}$. When exposed to visible light at 400 nm, the rate of $H_2$ production decreased slightly, reaching 215.92 μmol $g^{-1}$·$h^{-1}$. These findings show that changing the light wavelength can effectively control the photocatalytic $H_2$ production rate of the ppC$_{10}$@b-ZnO$_{vac}$ nanostructures. The decrease in $H_2$ production rate with increasing wavelength of monochromatic light may be attributed to an increase in visible light excitability; if a specific catalyst is less effective in utilizing UV photons, then this may overcompensate for the beneficial effect of extended excitability, resulting in decreased overall photocatalytic performance. $H_2$ production catalysts may be more efficient under visible light irradiation; however, increasing visible light activity does not necessarily lead to better performance under higher wavelength of light irradiation. Aeroxide P25 has enhanced photocatalytic efficiency compared to their highly visible-light-active $TiO_2$ under solar irradiation [Wang, Z. et al., Photocatalytic degradation of phenol in aqueous nitrogen-doped $TiO_2$ suspensions with various light sources, *Appl. Catal. B*, 2005, 57, 223-231, which is incorporated herein by reference in its entirety]. Photocatalytic efficiency in the visible range (400 <λ<550 nm) has been reported to be lower than in the UV-A range in $TiO_2$ materials [Emeline, A. V. et al., Spectral dependences of the activity and selectivity of N-doped $TiO_2$ in photodegradation of phenols, *J. Photochem. Photobiol. A: Chem.*, 2009, 207. 13-19, which is incorporated herein by reference in its entirety].

The recyclability of photocatalysts is used for successful recycling deployment. The recyclability of the visible active ppC$_{10}$@b-ZnO$_{vac}$ nanostructure was determined by exposing it to five successive cycles of action, each lasting about 20 h, as shown in FIG. 10C. After five cycles, the ppC$_{10}$@b-ZnO$_{vac}$ nanostructure maintained a consistent rate of $H_2$ production and preserved 95.91% of its initial value. The ppC$_{10}$@b-ZnO$_{vac}$ nanostructure show photocatalytic reusability, keeping their effectiveness over several cycles. The stable semiconductor ppC is responsible for the robust contact with b-ZnO$_{vac}$.

FIG. 11 displays a mechanism of the ppC$_{10}$@b-ZnO$_{vac}$ nanostructure to create $H_2$ via photocatalysis. Mulliken's electronegativity function [Mohamed, M. J. S. et al., Novel NRGO-CoWO$_4$-Fe$_2$O$_3$ nanocomposite as an efficient catalyst for dye degradation and reduction of 4-nitrophenol, *Mater. Chem. Phys.*, 2018, 208, 112-122, which is incorporated herein by reference in its entirety] was used to measure the potential of the photocatalyst's EvB and ECB band edges. The EvB was estimated to be +2.705 eV, while the ECB was determined to be-0.125 eV (see FIG. 9). The ppC$_{10}$@b-ZnO$_{vac}$ nanostructures has a large number of oxygen vacancies, which creates a new donor level below the CB, forming an oxygen vacancy state (O$_{vac}$) and serving as a photoelectron capture center. When b-ZnO$_{vac}$ is exposed to visible light, it excites VB electrons, which subsequently transfer to the CB and form O$_{vac}$. Furthermore, the ppC found within the ppC$_{10}$@b-ZnO$_{vac}$ nanostructure acts as electron acceptors. The addition of ppC, which works as a framework to increase the dispersion of b-ZnO$_{vac}$ and as a charge receptor, may be responsible for increased photocatalytic efficacy. ppC has a high capacity for efficiently moving photo-generated electrons across its surface and increasing their mobility. High electron mobility increases the likelihood that electron-hole pairs formed by light don't combine because electrons are quickly caught and assembled. Addition of ppC increases electron transfer in the ppC$_{10}$@b-ZnO$_{vac}$ nanostructures, making it a more favorable method for electron transmission. Light-generated electrons in b-ZnO$_{vac}$'s CB travel to the surface of ppC particles via chemically connected Zn-C/Zn—O—C interfaces, and some electrons will migrate to the O$_{vac}$, which promotes the separation and migration of photoelectrons and holes, thereby improving the photocatalytic property of the ppC$_{10}$@b-ZnO$_{vac}$ nanostructures. Following that, the electrons on the CB and O$_{vac}$, as well as holes on the VB, created on the surface of the ppC$_{10}$@b-ZnO$_{vac}$ nanostructures react with water and methanol molecules adsorbed on the same surface in aqueous solution to promote the separation and generation of photoelectron-hole pairs. This process generates $H_2$ gas, as seen in FIG. 11.

Methanol aids as a sacrificial substance that acts as a hole scavenger. Thus, methanol may be utilized to relate the oxidation of an organic molecule to the reduction of protons. A GC was used to investigate gaseous products, which included TCD and FID detectors, to test the efficacy of photocatalytic $H_2$ production from aqueous methanol using the nanostructures. The aqueous methanol solution mostly exhibits photocatalytic activity in the gas phase, resulting in the creation of $H_2$. Additionally, small amounts of carbon monoxide (CO), carbon dioxide ($CO_2$), and methane ($CH_4$) are produced. Following the photocatalytic trial, the fluid phase was analyzed using the GC with FID and MSD detectors. Methanol undergoes oxidation, resulting in the synthesis of formaldehyde (HCHO) and formic acid (HCOOH) as intermediates, eventually leading to $CO_2$ generation. Methanol works as a sacrificial substance, which is oxidized by photo-generated holes in catalytic materials [Neena, D. et al., Fabrication of ZnO/N-rGO composite as highly efficient visible-light photocatalyst for 2, 4-DCP degradation and $H_2$ evolution, *Appl. Surf. Sci.*, 2019, 488, 611-619, which is incorporated herein by reference in its entirety]. The light-induced process generates electrons, which are subsequently employed to catalyze the conversion of $H^+$ ions into $H_2$. The increased photocatalytic process was achieved by the synergistic effect of ppC and b-ZnO$_{vac}$, which were aided by the presence of O$_2$ vacancy defects and a chemically connected Zn-C/Zn—O—C interface. ppC$_{10}$@b-ZnO$_{vac}$ nanostructures offer advantages, including visible light activity, acceleration of electron transport, and reducing electron-hole pair recombination, leading to a faster rate of H$_2$ production [Mou, Z. et al., TiO$_2$ nanoparticles-functionalized N-doped graphene with superior interfacial contact and enhanced charge separation for photocatalytic hydrogen generation, *ACS Appl. Mater. Interfaces*, 2014, 6, 13798-13806, which is incorporated herein by reference in its entirety].

To evaluate the stability of the ppC$_{10}$@b-ZnO$_{vac}$ nanostructures, XRD and SEM analysis was recorded. The SEM image and XRD spectra of the used nanostructures, displayed in FIG. 10D, reveal the presence of particle aggregations. The structures remained intact and did not deteriorate throughout the photocatalytic process. The prepared ppC$_{10}$@b-ZnO$_{vac}$ nanostructures are stable. Improved photocatalytic performance of ppC$_x$@b-ZnO$_{vac}$ nanostructures for H$_2$ production may be due to: (1) the fundamental function of the b-ZnO$_{vac}$ that undergoes surface hydroxylation modification of O$_2$ defects by the Mars-van-Krevelen process, resulting in a color shift from white to black; (2) the presence of b-ZnO$_{vac}$ defects reduced the bandgap, allowing for visible light absorption; (3) ppC promotes the absorption of visible light; (4) ppC increases electron transport rate, minimizing charge recombination; (5) ppC serves as effective cocatalysts; (6) the combination of b-ZnO$_{vac}$ with ppC produces synergistic effects; And (7) O$_2$ vacancies are formed in b-ZnO$_{vac}$, and there is a strong chemical interaction between ppC and b-ZnO$_{vac}$ via Zn—C/Zn—O—C interfaces. The chemical interaction between ppC and b-ZnO$_{vac}$ allows for the efficient and rapid flow of active electrons from b-ZnO$_{vac}$'s conduction band to ppC in ppC$_x$@b-ZnO$_{vac}$ nanostructures, increasing catalytic activity.

A new bio-carbon derived from bio-waste (ppC) with oxygen-deficient black zinc oxide (b-ZnO$_{vac}$) nanomaterials using a simple technique involving ultrasonication-assisted laser beam irradiation was established. XPS investigation verified the existence of surface O$_2$ defects and vacancies as well as chemical bonds among carbon and zinc via carbon-zinc (C—Zn) and/or carbon-oxygen-zinc (C—O—Zn) connection interfaces in the prepared nanostructures. The effectiveness of the ppC$_x$@b-ZnO$_{vac}$ nanostructures in photocatalysis was evaluated for the production of H$_2$ from a methanol solution. The ppC$_{10}$@b-ZnO$_{vac}$ nanostructures showed high photocatalytic H$_2$ effectiveness, producing 215.92 μmol·h$^{-1}$·g$^{-1}$ in a methanol solution. When exposed to visible light, ppC$_x$@b-ZnO$_{vac}$ nanostructures produce more H$_2$ due to surface O$_2$ vacancy defects in b-ZnO$_{vac}$. Synergistic effects and strong chemical interactions between ppC and b-ZnO$_{vac}$, facilitated by Zn—C/Zn—O—C interfaces, enable efficient transfer of energetic electrons. ppC$_x$@b-ZnO$_{vac}$ nanostructures facilitate the visible-light-activated photocatalytic breakdown of methanol, leading to the creation of H$_2$. A novel approach to producing efficient and affordable carbon materials derived from biowaste, as well as defect-rich metal oxide-based photocatalysts, which have a wide range of potential uses for energy production, water splitting, and environmental remediation applications is achieved.

Numerous modifications and variations of the present disclosure are possible in light of the above teachings. It is therefore to be understood that within the scope of the appended claims, the disclosure may be practiced otherwise than as specifically described herein.

The invention claimed is:

1. A composite material, comprising:
   pineapple peel carbon; and
   oxygen-deficient black zinc oxide nanoparticles,
   wherein the composite material comprises 2 to 20 weight percent (wt. %) pineapple peel carbon based on a total weight of the composite material,
   wherein the pineapple peel carbon and the oxygen-deficient black zinc oxide nanoparticles are bonded through carbon-zinc interfaces and carbon-oxygen-zinc interfaces, wherein the pineapple peel carbon has a sheet morphology,
   wherein the oxygen-deficient black zinc oxide nanoparticles are coated with the pineapple peel carbon,
   wherein the composite material has an X-ray diffraction (XRD) peak at a 2θ value of 36.27° to 36.34°.

2. The composite material of claim 1, wherein the oxygen-deficient black zinc oxide nanoparticles are made by a process comprising:
   sonicating zinc oxide powder in an alcohol for 10 to 20 minutes to form a dispersed mixture;
   stirring and irradiating the dispersed mixture with a Nd:YAG pulsed laser at a wavelength of 532 nanometers (nm) for 40 to 80 minutes;
   filtering the irradiated, dispersed mixture to collect a solid; and
   drying the solid to form the oxygen-deficient black zinc oxide nanoparticles.

3. The composite material of claim 2, wherein the Nd:YAG pulsed laser has a pulse-energy of 350 millijoules (mJ), a pulse-duration of 10 nanosecond (ns), a pulse-width of 9 ns, and a pulse-repetition frequency of 10 hertz (Hz).

4. The composite material of claim 1, wherein the composite material is made by a process comprising:
   sonicating the pineapple peel carbon and the oxygen-deficient black zinc oxide nanoparticles in water for 40 to 80 minutes to form a mixture;
   filtering the mixture to collect a product; and
   drying the product at a temperature of 60 to 100 degrees Celsius (C) for 12 to 36 hours to form the composite material.

5. The composite material of claim 1, wherein a weight ratio of the pineapple peel carbon to the oxygen-deficient black zinc oxide nanoparticles is 1-20:100.

6. The composite material of claim 4, wherein the sonicating occurs for 50 to 70 minutes.

7. A method of hydrogen production, comprising:
   contacting the composite material of claim 1 with methanol to form a solution; and
   stirring and irradiating the solution at a wavelength of 390 to 410 nm for 2 to 6 hours to form hydrogen gas.

8. The method of claim 7, wherein the composite material produces hydrogen at a rate of 200 to 230 micromoles per hour per gram (μmol·h$^{-1}$·g$^{-1}$).

9. The composite material of claim 1, wherein the composite material has an O 1s peak at 532 to 534 electronvolts (eV), indicating a Zn—O—C bond via X-ray photoelectron spectroscopy (XPS).

10. The composite material of claim 1, wherein the sheet morphology of the pineapple peel carbon has a longest dimension of 0.5 to 3 micrometers (μm).

11. The composite material of claim 1, wherein the oxygen-deficient black zinc oxide nanoparticles have a longest dimension of 10 to 100 nm.

12. The composite material of claim 1, wherein the oxygen-deficient black zinc oxide nanoparticles are agglomerated.

13. The composite material of claim 1, wherein the composite material comprises zinc in an amount of 45 to 55 wt. %, carbon in an amount of 35 to 40 wt. %, and oxygen in an amount of 10 to 15 wt. % based on the total weight of the composite material.

14. The composite material of claim 1, wherein the composite material has a g value of 1.9 to 2 determined by electron paramagnetic resonance.

15. The composite material of claim 1, wherein the composite material has a bandgap energy value of 2.8 to 3.1 eV.

16. The method of claim 7, further comprising:
irradiating the solution at a wavelength of 370 to 390 nm.

17. The method of claim 16, wherein the composite material produces hydrogen at a rate of 230 to 250 $\mu mol \cdot h^{-1} \cdot g^{-1}$.

18. The method of claim 7, further comprising:
repeating the contacting and stirring and irradiating 4 to 6 times,
wherein after the repeating the composite material has a hydrogen production rate of at least 95% of an initial hydrogen production rate of the composite material.

19. The composite material of claim 1, wherein the composite material has a valence band value of 2.6 to 2.8 eV.

20. The composite material of claim 1, wherein the composite material has a conduction band value of −0.15 to −0.1 eV.

* * * * *